(12) United States Patent
Usui et al.

(10) Patent No.: US 7,177,051 B2
(45) Date of Patent: Feb. 13, 2007

(54) HALFTONING METHOD AND APPARATUS, AND COMPUTER-READABLE RECORDING MEDIUM IN WHICH HALFTONING PROGRAM IS RECORDED

(75) Inventors: Nobuaki Usui, Kawasaki (JP); Tetsuo Asano, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 720 days.

(21) Appl. No.: 09/818,498

(22) Filed: Mar. 28, 2001

(65) Prior Publication Data
US 2002/0080419 A1 Jun. 27, 2002

(30) Foreign Application Priority Data
Jul. 21, 2000 (JP) ............................... 2000-220279

(51) Int. Cl.
*H04N 1/40* (2006.01)
(52) U.S. Cl. .................. 358/3.05; 358/3.03; 358/3.06; 382/237; 382/252
(58) Field of Classification Search ............... 358/3.03, 358/3.05, 3.06; 382/232, 237, 252, 260
See application file for complete search history.

(56) References Cited

U.S. PATENT DOCUMENTS

| | | | | |
|---|---|---|---|---|
| 5,107,346 A | * | 4/1992 | Bowers et al. | 358/447 |
| 5,208,684 A | * | 5/1993 | Itoh | 358/3.03 |
| 5,754,311 A | | 5/1998 | Ray | 358/456 |
| 5,757,517 A | * | 5/1998 | Couwenhoven et al. | 358/463 |

FOREIGN PATENT DOCUMENTS

| | | |
|---|---|---|
| JP | 5-142746 | 6/1993 |
| JP | 6-6586 | 1/1994 |

* cited by examiner

*Primary Examiner*—Thomas D. Lee
(74) *Attorney, Agent, or Firm*—Staas & Halsey LLP

(57) ABSTRACT

A halftoning apparatus free of the occurrence of moiré and other artifacts under a simple technique. In the apparatus, the estimating section calculates the pixel value of the noteworthy pixel, which is to be converted into a binary value, based on other pixel values than that of the noteworthy pixel, and the binarizing section converts the multilevel value of the noteworthy pixel into a binary value.

41 Claims, 19 Drawing Sheets

FIG. 5(A)

| 0  | -1 | 0  |
|----|----|----|
| -1 | 4  | -1 |
| 0  | -1 | 0  |

FIG. 5(B)

| 1  | -2 | 1  |
|----|----|----|
| -2 | 4  | -2 |
| 1  | -2 | 1  |

FIG. 6(A)

$$\sqrt{\left(\begin{array}{ccc} 1 & 0 & -1 \\ 1 & 0 & -1 \\ 1 & 0 & -1 \end{array}\right)^2 + \left(\begin{array}{ccc} 1 & 1 & 1 \\ 0 & 0 & 0 \\ -1 & -1 & -1 \end{array}\right)^2}$$

FIG. 6(B)

$$\sqrt{\left(\begin{array}{ccc} -1 & 0 & 1 \\ -1 & 0 & 1 \\ -1 & 0 & 1 \end{array}\right)^2 + \left(\begin{array}{ccc} -1 & -1 & -1 \\ 0 & 0 & 0 \\ 1 & 1 & 1 \end{array}\right)^2}$$

FIG. 8(A)

|   |   | ● | a | b |
|---|---|---|---|---|
| c | d | e | f | g |
| h | i | j | k | l |

FIG. 8(B)

|   |   | ● | X | Y |
|---|---|---|---|---|
| U | Z | X | Z | U |
| Z/2 | U | Y | U | Z/2 |

WEIGHTING FACTOR=1/16
● : NOTEWORTHY PIXEL A

WEIGHTING FACTOR=1/42
●:NOTEWORTHY PIXEL A

HALFTONING METHOD AND APPARATUS, AND COMPUTER-READABLE RECORDING MEDIUM IN WHICH HALFTONING PROGRAM IS RECORDED

BACKGROUND OF THE INVENTION

1. Field of the Invention

The present invention relates to a halftoning method and apparatus for converting a multilevel input image, such as a continuous-tone color image, into a binary image, and also to a computer-readable recording medium in which a halftoning program is recorded.

2. Description of the Related Art

For reproducing a tone-graduation image (e.g., multilevel image and continuous-tone color image) on a printer that is dedicated to binary outputting, it is necessary to convert values of the multilevel image into binary values. The binary-type printer realizes reproduction of tone graduation by modification in terms of dot area or dot density. In the following description, the terms "binarizing" and "halftoning" are used each as a word having a meaning "converting a multilevel image into a binary image".

Consequently, in such halftoning, it has been required to make moiré and artifacts, which does not appear in the original image (multilevel image), unconscious and also to reproduce the tone graduation of the original image with the best possible fidelity.

The conventional halftoning technology is exemplified by the following:

(1) Japanese Patent Laid-Open Publication No. HEI 6-070144 (Application No. HEI 5-142746) discloses an attempt to realize a moiré- or artifact-free binary image by carrying out the error diffusion method along "a random spatial filling two-dimensional curve" throughout the entire original image.

(2) Japanese Patent Laid-Open Publication No. HEI 6-006586 discloses an alternative attempt to realize a moiré- or artifact-free binary image by minimizing energy functions that are calculated from values of the original image (multilevel image) and those of a binary image, utilizing the "simulated annealing method". As this method two technique are currently known; one technique is to directly converting values of the original image, and the other technique is to previously obtain 256-grade dither patterns prior to converting values of the original image.

However, these conventional technologies would encounter the following problems:

(1) As to the technology disclosed in Japanese Patent Laid-Open Publication No. HEI 6-070144, because an entire image is processed by the same algorithm, moiré or artifacts would be inevitable with the converted binary image. In a patterned image such as a checkered one, in particular, horizontal bands tend to appear significantly apparently after halftoning. Under the method of "the random spatial filling two-dimensional curve", since scanning is performed, during conversion, in a single continuous stroke-like manner, it is impossible to take parallel calculation, thereby requiring a huge processing time.

(2) As to the technology disclosed in Japanese Patent Laid-Open Publication No. HEI 6-006586, because huge time is needed in calculation during conversion, this technique would be less useful. As another disadvantage, in reduction of a very gentle tone-gradation image, a peculiar artifact would occur.

(3) In the above-mentioned conventional technologies, the multilevel pixel value of an object pixel (noteworthy pixel) to be halftoned is converted into a binary value, and an error accompanying the conversion is diffused to other pixels adjacent to the noteworthy pixel. So, in such technologies, if the pixel value of the noteworthy pixel is outstanding due to an image defect, a significant error risen from the outstanding value is also diffused to unprocessed adjacent pixels. For example, the moiré that is latently contained but not visually apparent in the original image, which moiré is due to periodic structure typical of an input device (scanner, digital camera, etc), could be enhanced by the error diffusing so that it becomes visually apparent after halftoned.

SUMMARY OF THE INVENTION

With the foregoing problems in view, one object of the present invention is to provide a halftoning method which prevents the moiré that is caused by sudden shifts between pixel values due to image defects in the original multilevel image and which also reduces moiré and other artifacts surely to a minimum by a simple technique.

Another object of the invention is to provide an apparatus for carrying out the above-mentioned halftoning method.

Still another object of the invention is to provide a computer-readable recording medium in which a halftoning program is stored.

In order to accomplish the above first-named object, according to a first generic feature of the present invention, there is provided a halftoning method of converting a multilevel input image into a binary image, comprising the steps of: (a) calculating the multilevel value of a given noteworthy pixel of the multilevel input image, as an estimated value of the noteworthy pixel, based on the multilevel values of pixels other than the noteworthy pixel; and (b) converting the estimated multilevel value of the noteworthy pixel into a binary value.

The above second-named object is accomplished by a halftoning apparatus for converting a multilevel input image into a binary image, comprising: an estimating section for calculating the multilevel value of a given noteworthy pixel of the multilevel input image, as an estimated value of the noteworthy pixel, based on the multilevel values of pixels other than the noteworthy pixel; and a binarizing section for converting the estimated multilevel value of the noteworthy pixel into a binary value.

The above third-named object is accomplished by a computer-readable recording medium in which a halftoning program for instructing a computer to execute a function of converting a multilevel input image into a binary image is recorded, wherein the halftoning program instructs the computer to function as the following: an estimating section for calculating the multilevel value of a given noteworthy pixel of the multilevel input image, as an estimated value of the noteworthy pixel, based on the multilevel values of pixels other than the noteworthy pixel; and a binarizing section for converting the estimated multilevel value of the noteworthy pixel into a binary value.

With this construction, at the conversion of the multilevel value of the noteworthy pixel into a binary value, the value to be converted is not the value of the noteworthy pixel itself but the estimated value of the noteworthy pixel, which was calculated based on the values of pixels other than the noteworthy pixel. Therefore, even if some pixels have outstanding pixel values due to image defects, significant errors risen from the outstanding value can be prevented from being directly diffused to non-binarized adjacent pixels.

The halftoning method may further comprise the step (c) of diffusing a possible error, which has occurred in binary value with respect to the noteworthy pixel, to multilevel pixels adjacent to the noteworthy pixel by a technique. A possible error, which has occurred in binary value with respect to the noteworthy pixel, may be diffused to the pixels used to calculate the estimated value of the noteworthy pixel in step (a).

According to the halftoning method and apparatus, and the computer-readable recording medium of the present invention, it is possible to guarantee the following advantageous results:

(1) at conversion of the multilevel value of the noteworthy pixel into a binary value, the value to be converted is not the value of the noteworthy pixel itself but the estimated value of the noteworthy pixel, which was calculated based on the values of pixels other than the noteworthy pixel. Accordingly, even if some pixels have outstanding pixel values due to image defects, significant errors risen from the outstanding value are prevented from being directly diffused to non-binarized adjacent pixels. It is thus possible to minimize moiré and other artifacts that did not appear in the original (multilevel) image.

(2) A two-dimensional digital filter facilitates the calculation of the estimated value of the noteworthy pixel.

(3) With a two-dimensional digital filter dedicated to enhancing the profile, such as a Laplacian filter or a Prewitt filter, in calculating the estimated value, it is possible to enhance profiles in a halftoned image, thus forming a well-defined image.

(4) Since an error diffusion technique is changed to another as the scanning of the pixels of the multilevel input image progresses, it is possible to minimize moiré and artifacts in the binary image, which did not appear in the multilevel image.

(5) Since the error diffusion technique is changed from one to another upon detection that the noteworthy pixel is a pixel constituting part of the profile of the multilevel input image, it is possible to localize the effects (i.e., moiré or other artifacts) that have been caused by the change of the error diffusion technique to dissolve into the profile, thus minimizing moiré and artifacts in the binary image, which did not appear in the original (multilevel) image.

(6) The change of the error diffusion technique for every pixel of the multilevel input image would also minimize moiré and artifacts in the binary image, which did not appear in the original (multilevel) image.

(7) Upon judgment that the noteworthy pixel is a pixel constituting part of the profile of the multilevel input image, values according to the possible error, which has occurred in the binary value with respect to the noteworthy pixel, are added to the values of the unscanned pixels along the profile in the detected direction as an exceptional process. This would also make it possible to minimize moiré and artifacts in the binary image, which did not appear in the original (multilevel) image.

(8) Since the profile value of the noteworthy pixel is calculated based on both the multilevel value of the noteworthy pixel and those of the adjacent pixels and then compared with a predetermined value, it is possible to facilitate discriminating the profile. Further, the profile discrimination can be carried out simultaneously with the scanning of the multilevel image, thus speeding up the profile detection.

(9) With a two-dimensional digital filter dedicated to enhancing the profile, such as a Laplacian filter or a Prewitt filter, in calculating the profile value, it is possible to facilitate discriminating the profile.

(10) The profile value can be directly calculated by making addition and subtraction individually on the multilevel values of the noteworthy pixel and the adjacent pixels. Since the profile value can thus be calculated without making any multiplication or division, it is possible to decrease the load of the calculation, thereby speeding up the calculation of the profile value.

(11) Since the error diffusion technique can be changed to another that is selected in a predetermined order from various different error diffusion techniques, it is possible to minimize moiré and artifacts in the binary image, which did not appear in the original (multilevel) image.

(12) Since the error diffusion technique can be changed to another that is selected at random from various different error diffusion techniques, it is possible to minimize moiré and artifacts in the binary image, which did not appear in the original (multilevel) image.

(13) Partly since the occurred error is proportionally distributed to the unscanned pixels adjacent to the noteworthy pixel in accordance with the predetermined weighting pattern, and partly since the error diffusion technique can be changed by changing the predetermined weighting pattern to another, it is possible to change the error diffusion technique easily and stably.

(14) If two or more multilevel input images to be halftoned have a substantially identical profile, a discrimination is made, for only one of the plural multilevel input images, whether or not the noteworthy pixel is a pixel constituting part of the profile. And the result of the discriminating can be used in halftoning the remaining multilevel input images. It is therefore possible to halftone the plural multilevel input images without making this discrimination for the remaining multilevel input images, thus improving the practical speed of halftoning.

Other objects and further features of the present invention will be apparent from the following detailed description when read in conjunction with the accompanying drawings.

BRIEF DESCRIPTION OF THE DRAWINGS

FIGS. 5A and 5B are diagrams each illustrating a Laplacian filter;

FIGS. 6A and 6B are diagrams each illustrating a Prewitt filter;

FIG. 8A is a diagram showing non-binarized pixels adjacent to the noteworthy pixel. FIG. 8B is a diagram illustrating a two-dimensional digital filter applied to the pixels illustrated in FIG. 8A;

DESCRIPTION OF THE PREFERRED EMBODIMENT(S)

One preferred embodiment of the present invention will now be described with reference made to the accompanying drawings.

Figure 2:
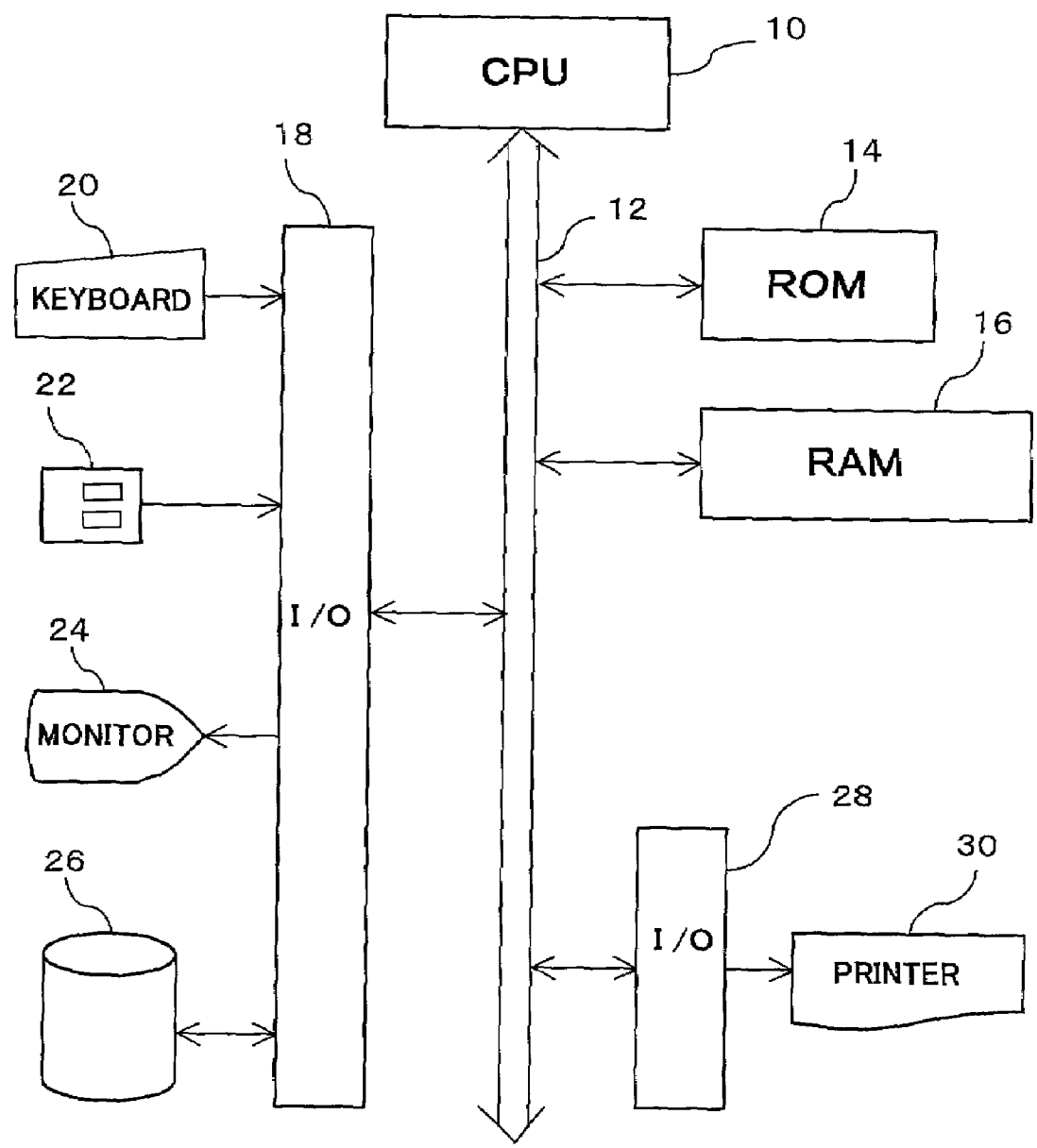
FIG. 2 is a block diagram showing a computer system on which the halftoning apparatus of FIG. 1 is realized.

FIG. 2 is a block diagram showing a computer system which realizes a halftoning apparatus according to one embodiment of the present invention. As shown in FIG. 2, the computer system of the present embodiment includes a CPU 10, and a bus line 12 connected to the CPU 10.

A ROM 14 and a RAM 16 are connected to the bus line 12. Also a keyboard 20, a mouse 22, a monitor (such as CRT, LCD, PDP) 24, and a magnetic disc 26 are connected to the bus line 12 via an input/output interface (I/O) 18. Still also a printer 30 is connected to the bus line 12 via another input/output interface (I/O) 28.

An application program is stored in a RAM 16 and operates with a binarizing section 51, an error diffusing section 52, an error diffusion technique changing section 53, a pixel-on-profile detection section 54, a direction-of-profile detection section 55, and an estimating section 56 on the CPU. When the application program is read out from the RAM 16 via the bus line 12, the CPU 10 functions (described in detail later) as the binarizing section 51, the error diffusing section 52, the error diffusion technique changing section 53, the pixel-on-profile detection section 54, the direction-of-profile detection section 55 and the estimating section 56, to realize the halftoning apparatus of the present embodiment.

The program, which instructs the CPU 10 to function as the binarizing section 51, the error diffusing section 52, the error diffusion technique changing section 53, the pixel-on-profile detection section 54, the direction-of-profile detection section 55, and the estimating section 56, is recorded in a computer-readable recording medium, such as, a floppy disc, a CD-ROM, etc. The computer reads out the program from the recording medium, and stores the read-out program into an internal storage device or an external storage device. Alternatively the program may be stored in a storage device, such as a magnetic disc, and the program may be provided from the storage device to the computer over a communications channel or path.

When realizing the functions of the binarizing section 51, the error diffusing section 52, the error diffusion technique changing section 53, the pixel-on-profile detection section 54, the direction-of-profile detection section 55, and the estimating section 56, the program newly stored in the internal storage device (RAM 16 in the present embodiment) is executed by a microprocessor (CPU 10 in the present embodiment) of the computer. Alternatively the computer may directly read out the program from the recording medium for this execution.

In the present embodiment, the term "computer" is hardware and an operation system inclusive, meaning hardware operable under the control of an operation system. Assuming that the application program solely operates hardware in the absence of an operation system, such hardware itself is regarded as an equivalent to a computer. Accordingly hardware includes at least a microprocessor, such as CPU, and a read-out device for reading out a computer program recorded in a recording medium.

The application program includes program codes for instructing the computer to function as the binarizing section 51, the error diffusing section 52, the error diffusion technique changing section 53, the pixel-on-profile detection section 54, the direction-of-profile detection section 55, and the estimating section 56. Alternatively, part of these functions may be realized by the operation system rather than the application program.

Further, the recording medium of the present embodiment may be in the form of one selected from various kinds of computer-readable media that are exemplified by a floppy disc, CD-ROM, a magnetic disc, an optical disc, a magneto-optical disc, an IC card, a ROM cartridge, a magnetic tape, a punch card, an internal or external storage device (memory such as RAM or ROM) of a computer, and printed matter printed or otherwise labeled with codes such as bar codes.

Figure 1:
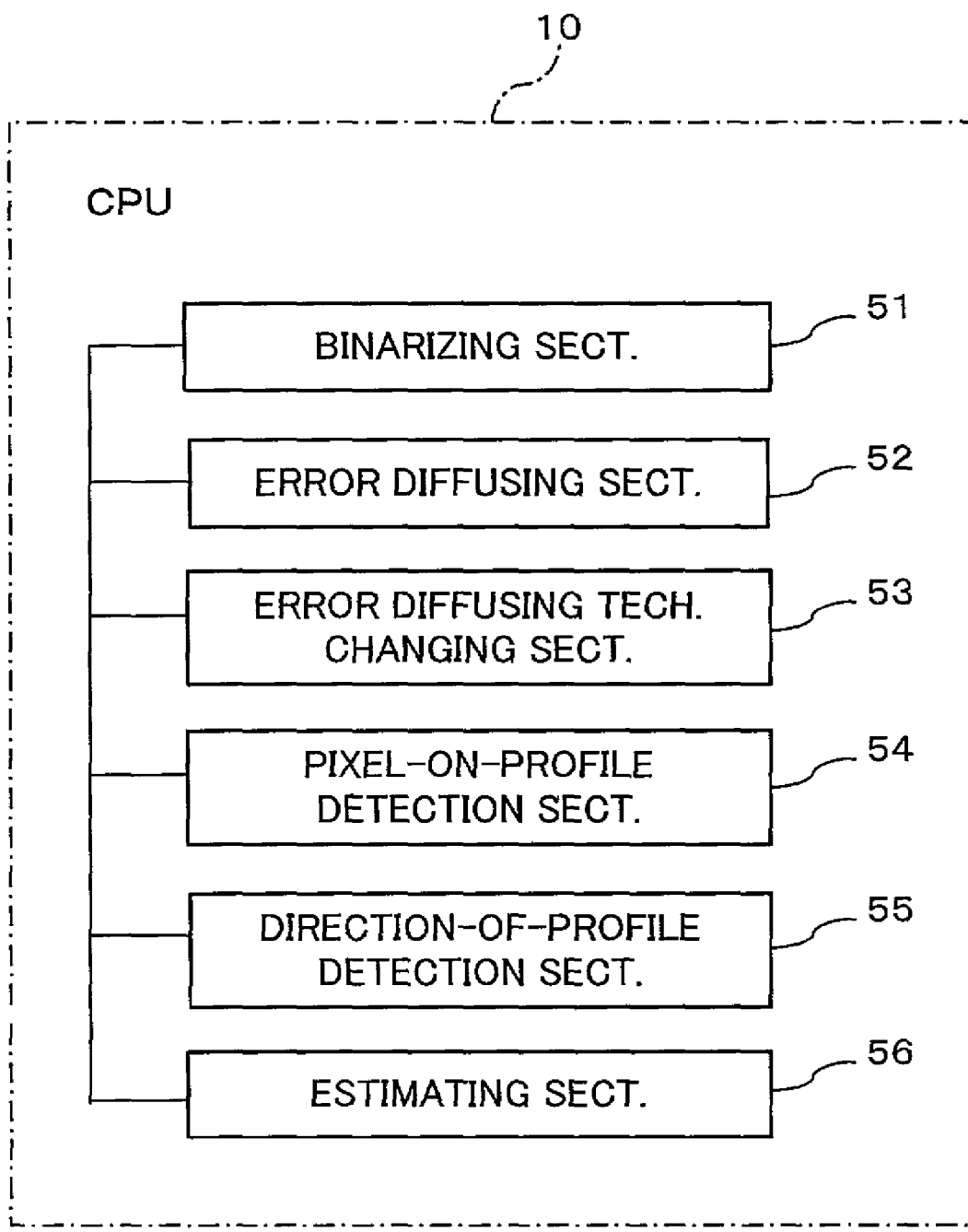
FIG. 1 is a block diagram showing a functional construction of a halftoning apparatus according to one embodiment of the present invention.

The computer system of the present embodiment shown in FIG. 2 functions as the halftoning apparatus which converts a multilevel input image into a binary image. As shown in FIG. 1, the computer system functions as the binarizing section 51, the error diffusing section 52, the error diffusion technique changing section 53, the pixel-on-profile detection section 54, the direction-of-profile detection section 55, and the estimating section 56.

Figure 3A:
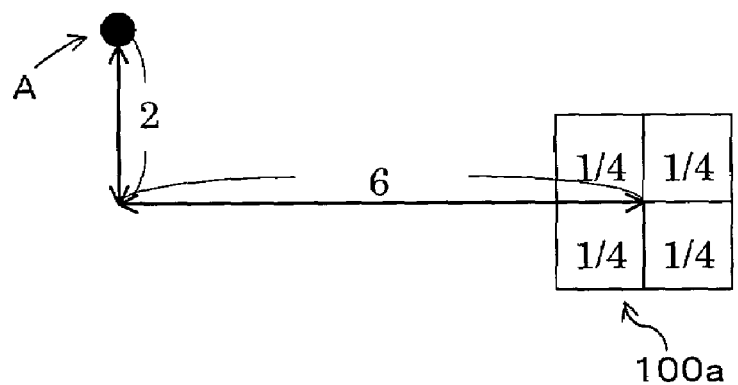
FIGS. 3A and 3B are diagrams illustrating the manner in which the pixel value of the noteworthy pixel is estimated.
Figure 3B:
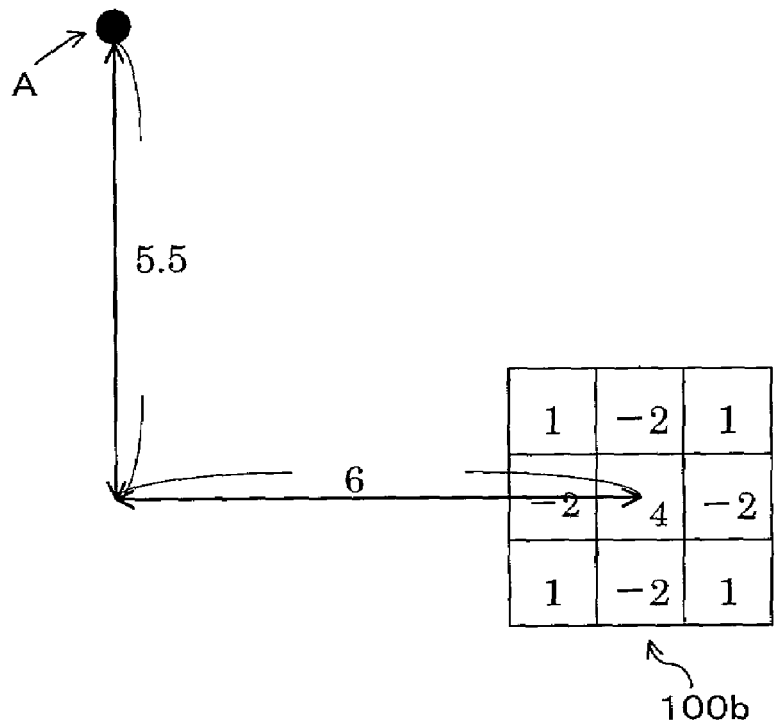

FIG. 1 is a block diagram showing a functional construction of the halftoning apparatus of the present embodiment. FIGS. 3A and 3B are diagrams each illustrating the manner in which the pixel value of the noteworthy pixel is estimated.

The halftoning apparatus of the present embodiment first expands image data of a multilevel input image on the memory (RAM 16) or the like. The estimating section 56 calculates the value (hereinafter also called "estimated value") of the noteworthy pixel based on the multilevel values of pixels other than the noteworthy pixel, and the binarizing section 51 then binarizes the noteworthy pixel based on the estimated pixel value.

In the present embodiment, each pixel to be binarized is defined as having a pixel value in a range of 0 to 255, having a pixel value of either 0 or 255 after halftoned (binarized). However, the present invention is not limited to a pixel value in a range of 0 to 255.

The estimating section 56 calculates the pixel value of the noteworthy pixel (reference character A of FIGS. 3A and 3B) based on the multilevel values of pixels other than the noteworthy pixel A. Specifically, a two-dimensional digital filter is applied to non-binarized (multilevel) pixels, other than the noteworthy pixel, included in a predetermined area. One of the following three types of techniques (1) through (3) is selectively used to calculate the estimated value of the noteworthy pixel A.

(1) First Estimating Method:

FIG. 3A shows one technique of estimating the pixel value of the noteworthy pixel A in which a common two-dimensional digital filter is used. The pixel value of the noteworthy pixel A is estimated based on the values of non-binarized pixels in a predetermined area (2×2 pixels in FIG. 3A) that centers around a position predetermined distance (2×6 pixels in FIG. 3A) apart from the noteworthy pixel A.

Using a matrix 100a (for example, 2×2-pixel area in FIG. 3A) as of FIG. 3A, a two-dimensional filter of FIG. 3A scans 2×2 pixels in the predetermined area while making calculations with the pixel values in the matrix 100a. Specifically, after multiplying each value of the pixels in the matrix 100a by ¼, the results of the multiplications are added to obtain the pixel value of the noteworthy pixel A as the estimated pixel value.

(2) Second Estimating Method:

FIG. 3B shows another technique of estimating the pixel value of the noteworthy pixel A in which a digital filter dedicated to enhancing the profile is used. The pixel value of the noteworthy pixel A is estimated based on the values of non-binarized pixels in a 3×3-pixel area (predetermined area) that centers around a pixel located 5.5×6 pixels (predetermined distance) apart from the noteworthy pixel A.

Using a matrix 100b (for example, 3×3-pixel area in FIG. 3B) as of FIG. 3B, a two-dimensional filter of FIG. 3B scans 3×3 pixels in the predetermined area while making calculations with the pixel values in the matrix 100b. Specifically, the digital filter dedicated to enhancing the profile is applied to each of the pixels in the predetermined area to estimate the pixel value of the noteworthy pixel A.

In use of the digital filter dedicated to enhancing the profile, a Lapracian filter (FIGS. 5A and 5B) or a Prewitt filter (FIGS. 6A and 6B) is preferred. FIG. 3B shows an example in which the Lapracial filter is employed.

A manner will now be described in which the pixel value of the noteworthy pixel A is estimated using the digital filter dedicated to enhancing the profile.

Figure 4:
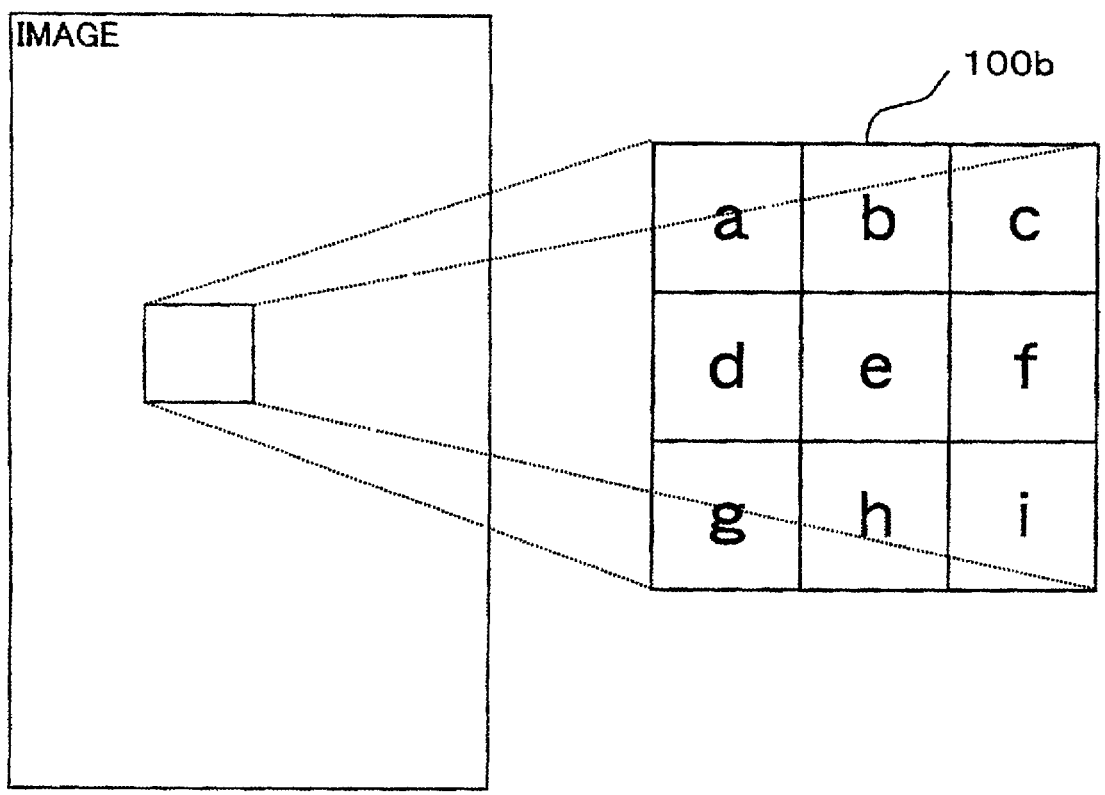
FIG. 4 is a diagram illustrating the manner in which a two-dimensional digital filter dedicated to enhancing the profile is used.
Figures 5A, 5B:
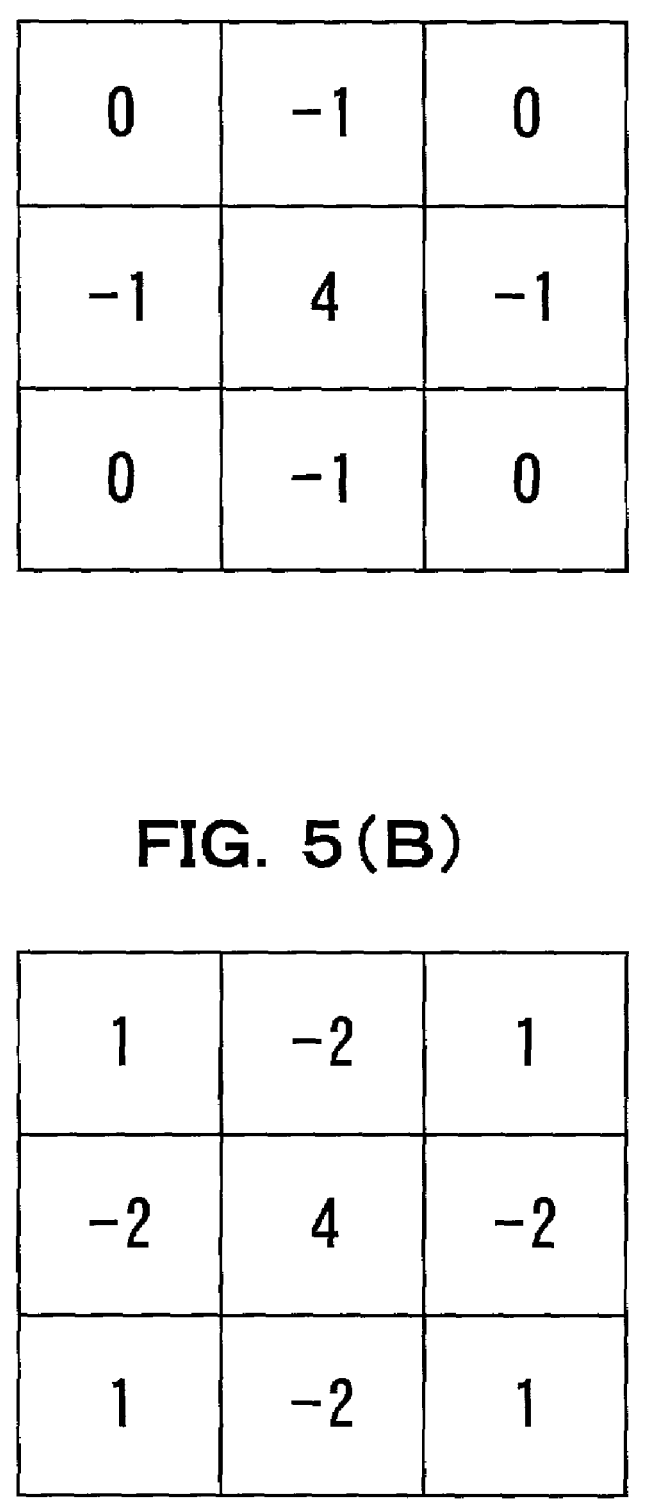

FIG. 4 illustrates the manner in which a two-dimensional digital filter dedicated to enhancing the profile is used. FIGS. 5A and 5B and FIGS. 6A and 6B respectively show two-dimensional digital filters dedicated to enhancing the profile: FIGS. 5A and 5B illustrate Laplacian filters; FIGS. 6A and 6B, Prewitt filters.

When the two-dimensional digital filter dedicated to enhancing the profile is used to calculate the estimated value (hereinafter designated by $\alpha$) of the noteworthy pixel A, the estimating section 56 applies the multilevel values of the pixels covered by the matrix 100b of FIG. 4 (a, b, c, d, e, f, g, h, i in FIG. 4) to the two-dimensional digital filter dedicated to enhancing the profile (e.g., Laplacian filter or Prewitt filter), shown in FIGS. 5A and 5B, and FIGS. 6A and 6B.

For example, when the Laplacian filter of FIG. 5A is used, the estimated value $\alpha$ is given by $$\alpha=(a\times 0)+\{b\times(-1)\}+(c\times 0)+\{d\times(-1)\}+(e\times 4) + \{f\times(-1)\}+(g\times 0)+\{h\times(-1)\}+(i\times 0).$$

Also when using the Laplacian filter of FIG. 5B, the estimated value $\alpha$ can be obtained likewise.

In the illustrated embodiment, two types of Laplacian filters of FIGS. 5A and 5B, are used. The present invention should by no means be limited to this illustrated examples, and alternative Laplacian filters having other patterns may be used. Specifically, as long as it satisfies all the following conditions (i) through (iv), any two-dimensional digital filter dedicated to enhancing the profile can give the same results as those with a Laplacian filter. Here, alphabetical characters a through i designate pixel values each corresponding to a respective pixel value in the matrix 100b of FIG. 4.

(i) $|e|=|a+b+c+d+f+g+h+i|$ (ii) The sign of e is opposite to that of b, d, f, h.

(iii) The sign of e is the same as that of a, c, g, i; or $a=c=g=i=0$.

(iv) In the matrix 100b (FIG. 4), the values each obtained by multiplying the distance between the centering pixel (pixel value e) and each of the adjacent pixels (pixel values a, b, c, d, f, g, h, i) by |a|, |b|, |c|, |d|, |f|, |g|, |h|, |i|, respectively, become close to one another in largeness of digit (except that a, c, g, i=0).

Therefore, by employing the Laplacian filter of FIGS. 5A and 5B or any of two-dimensional digital filters dedicated to enhancing the profile that satisfy all the foregoing conditions (i) through (iv), it is possible to estimate the multilevel pixel value (the estimated value $\alpha$) of the noteworthy pixel A.

The manner in which the estimated value $\alpha$ is calculated using the Prewitt filters of FIGS. 6A and 6B, will now be described. In an example that uses the Prewitt filter of FIG. 6A, the estimated value $\alpha$ is given by $$\alpha=[[(a\times 1)+(b\times 0)+\{c\times(-1)\}+(d\times 1)+(e\times 0)+\{f\times(-1)\}+(g\times 1)+(h\times 0)+\{i\times(-1)\}]^2+[(a\times 1)+(b\times 1)+(c\times 1)+(d\times 0)+(e\times 0)+(f\times 0)+\{g\times(-1)\}+\{h\times(-1)\}+\{i\times(-1)\}]^2]^{1/2}.$$

Also in another example using the Prewitt filter of FIG. 6B, the estimated value $\alpha$ is obtained in the same way.

The estimating section 56 outputs the operation result, or the estimated value $\alpha$, which is obtained by applying the two-dimensional digital filter dedicated to enhancing the profile to the pixels in the predetermined area, as the pixel value of the noteworthy pixel A.

(3) Third Estimating Method:

The estimating section 56 estimates the value of the noteworthy pixel A based on the values of non-binarized pixels to which an error is diffused by the error diffusion section 52.

FIGS. 7A and 7B and FIGS. 8A and 8B are diagrams for describing the manner in which the value of the noteworthy pixel A is estimated based on the values of non-binarized pixels to which the error is diffused.

Figure 7A:
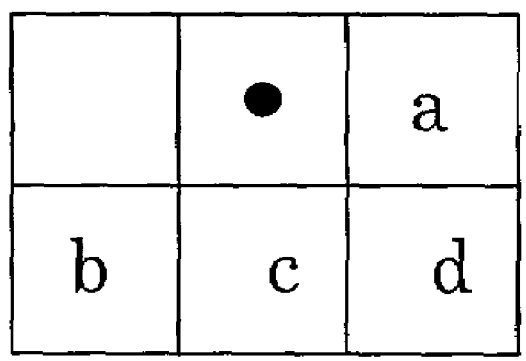
FIG. 7A is a diagram showing non-binarized pixels neighboring the noteworthy pixel.
Figure 7B:
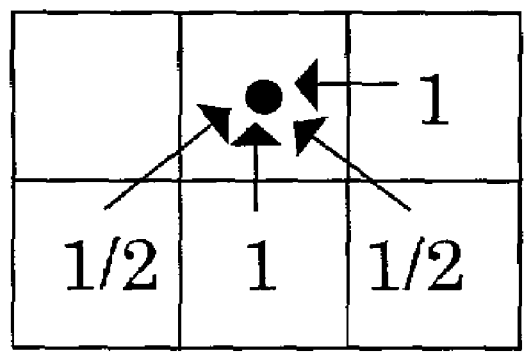
FIG. 7B is a diagram showing a two-dimensional digital filter applied to the pixels illustrated in FIG. 7A.

FIG. 7A illustrates the non-binarized pixels neighboring the noteworthy pixel A; FIG. 7B, a two-dimensional digital filter to be applied to the pixels of FIG. 7A.

Assuming that the non-binarized pixels neighboring the noteworthy pixel A respectively have the multilevel values of a, b, c, d as shown in FIG. 7A, the estimating section 56 applies the two-dimensional digital filter having weighting factors as of FIG. 7B to the pixel values a, b, c, d to estimate the noteworthy pixel A.

Specifically, in the example of FIGS. 7A and 7B, the multilevel value $\alpha$ of the noteworthy pixel A is calculated with the following equation (i) as the estimated value $\alpha$ of the noteworthy pixel A.

$$\alpha=(a+b/2+c+d/2)/3 \qquad (i)$$

The two-dimensional digital filter of FIG. 7B is preferred when performing an error diffusion technique (FIG. 10A) well known as "Floyd and Steinberg's Method".

Figures 8A, 8B:
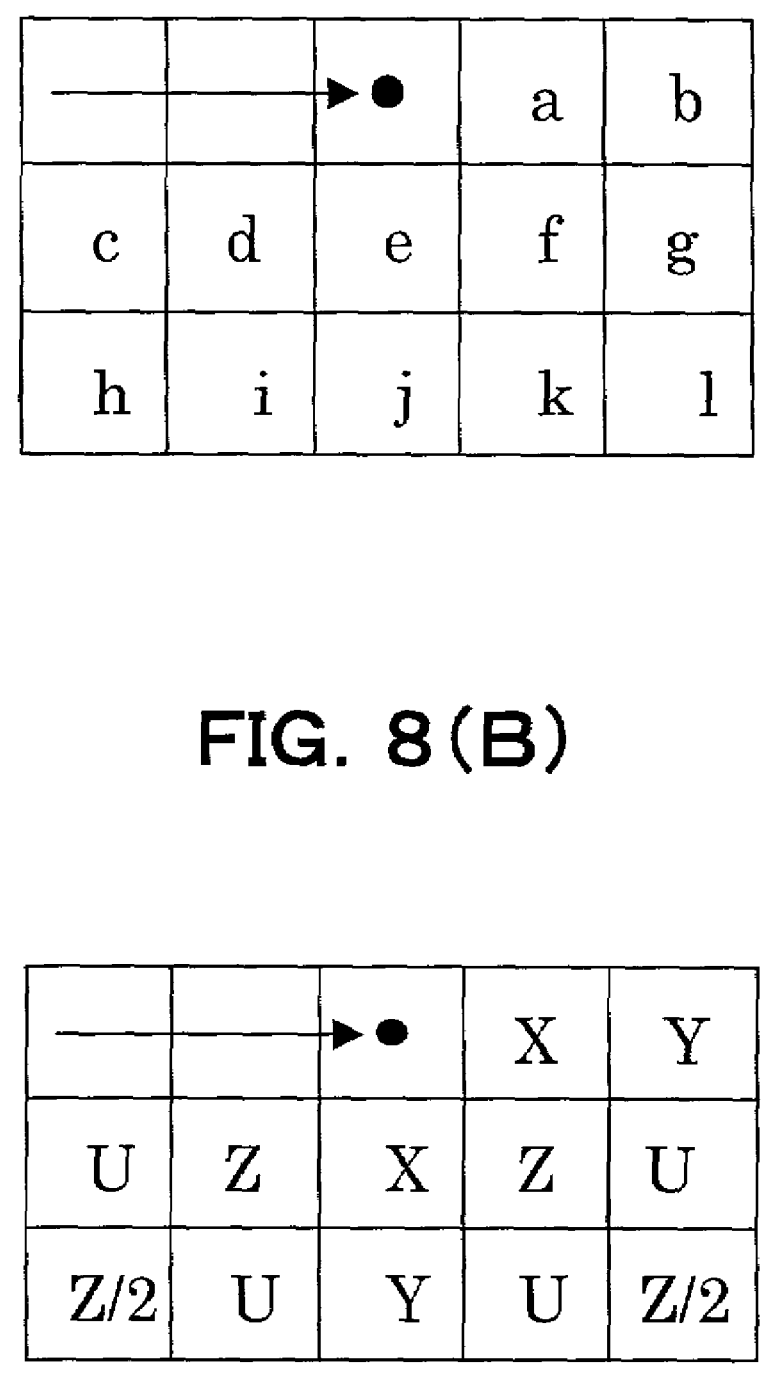

FIG. 8A illustrates the non-binarized pixels adjacent to the noteworthy pixel A; FIG. 8B, a two-dimensional digital filter to be applied to the pixels of FIG. 8A.

Assuming that the non-binarized pixels adjacent to the noteworthy pixel A respectively have the multilevel values of a, b, c, d, e, f, g, h, i, j, k, l as shown in FIG. 8A, the estimating section 56 applies the two-dimensional digital filter having weighting factors as of FIG. 8B to the pixel values a through l to estimate the noteworthy pixel A.

In FIG. 8B, the weighting factors are designated by reference characters X, Y, Z, U: for example, X=1, Y=1/2, Z=1/√2, U=1/√3. These weighting factors X, Y, Z, U should by no means be limited to these values and may be changed to other values.

In the example of FIGS. 8A and 8B, the multilevel value α of the noteworthy pixel A is calculated with the following equation (ii) to serve as the estimated value α of the noteworthy pixel A.

$$\alpha = \{X \cdot (a+e) + Y \cdot (b+j) + Z \cdot (h+l)/2 + U \cdot (c+g+i+k)\} \div \{(18 + 9 \times 2^{1/2} + 8 \times 3^{1/2})/6\} \quad \text{(ii)}$$

The two-dimensional digital filter of FIG. 8B is preferred when performing error diffusion techniques (described later with reference made to FIGS. 11A and 11B) well known as "Javis, Judice and Ninkes' Method" and "Stucki's Method" (described later with reference made to FIGS. 11A and 11B).

In the present embodiment, the estimating section 56 uses one of the above three types of methods (1) through (3) to calculate the estimated value α of the noteworthy pixel A.

The binarizing section 51 converts the multilevel value of a noteworthy pixel currently under scanning into a binary value based on the estimated value α of the noteworthy pixel A that is calculated by the estimating section 56. Precisely, the estimated value α of the noteworthy pixel A thus calculated by the estimating section 56 is compared with a predetermined value (e.g., 128); if the estimated value α of the noteworthy pixel A is equal to or larger than the predetermined value (α≧128), 255 (ON) is recorded as the value of the noteworthy pixel A in a predetermined area of the RAM 16 or the magnetic disc 26. Hereinafter, the pixel value of the noteworthy pixel A obtained after binarizing is designated by α' (α'=0 or α'=255).

To the contrary, if the pixel value α of the noteworthy pixel A is smaller than the predetermined value (α<128), 0 (OFF) is recorded as the pixel value α' of the noteworthy pixel in a designated area of the RAM 16 or the magnetic disc 26.

The pixel-on-profile detection section 54 discriminates whether or not the noteworthy pixel is a pixel that constitutes part of a profile of the multilevel input image (for convenience to describe, this discrimination will hereinafter occasionally be called "profile detection"). The pixel-on-profile detection section 54 calculates a profile value E with respect to the noteworthy pixel A based on both the multilevel value of the noteworthy pixel A and those of the adjacent pixels, using a Laplacian filter or a Prewitt filter or by making addition and subtraction individually on the multilevel values of the noteworthy pixel A and the adjacent pixels.

The thus obtained profile value E is then compared with a predetermined value, or a threshold T, to discriminate whether or not the noteworthy pixel is the pixel that constitutes part of the profile of the multilevel input image.

The threshold T, which can be set by an operator, plays as a parameter to control the degree of enhancement of the profile.

When calculating the profile value E with respect to the noteworthy pixel A, the pixel-on-profile detection section 54 scans the multilevel image data expanded on a memory (RAM 16) while arranging the matrix 100b (FIG. 4) so as to center the noteworthy pixel A (pixel value e of FIG. 4). For every noteworthy pixel A centering the matrix 100b, the profile value E is calculated using the digital filter dedicated to enhancing the profile. The profile value E is calculated in the same way as the estimated value α.

When the two-dimensional digital filter dedicated to enhancing the profile is used to calculate the profile value E with respect to the noteworthy pixel A, both the multilevel value (pixel value e) of the noteworthy pixel A and those of the adjacent pixels in the matrix 100b of FIG. 4 (a, b, c, d, f, g, h, i in FIG. 4) are applied to the two-dimensional digital filter dedicated to enhancing the profile (e.g., Laplacian filter or Prewitt filter), which filter is shown in FIGS. 5A and 5B, and FIGS. 6A and 6B.

For example, when the Laplacian filter of FIG. 5A is used, the profile value E is given by $$E = (a \times 0) + \{b \times (-1)\} + (c \times 0) + \{d \times (-1)\} + (e \times 4) + \{f \times (-1)\} + (g \times 0) + \{h \times (-1)\} + (i \times 0).$$

Also when using the Laplacian filter of FIG. 5B, the profile value E can be obtained likewise.

When the pixel-on-profile detection section 54 calculates the profile value E, two types of Laplacian filters of FIGS. 5A and 5B are used. The present invention should by no means be limited to this illustrated examples, and alternative Laplacian filters having other patterns maybe used. Precisely, as long as it satisfies all the following conditions (i) through (iv), any two-dimensional digital filter dedicated to enhancing the profile can give the same results as those with a Laplacian filter. Here, alphabetical characters a through i designate pixel values each corresponding to a respective pixel value in the matrix 100b of FIG. 4.

(i) |e|=|a+b+c+d+f+g+h+i|

(ii) The sign of e is opposite to that of b, d, f, h.

(iii) The sign of e is the same as that of a, c, g, i; or a=c=g=i=0.

(iv) In the matrix 100 (FIG. 4), the values each obtained by multiplying the distance between the noteworthy pixel (the pixel value e) and each of the adjacent pixels (pixel values a, b, c, d, f, g, h, i) by |a|, |b|, |c|, |d|, |f|, |g|, |h|, |i|, respectively, become close to one another in largeness of digit (except that a, c, g, i=0).

Therefore, by employing the Laplacian filter of FIGS. 5A and 5B, or any of two-dimensional digital filters dedicated to enhancing the profile that satisfy all the foregoing conditions (i) through (iv), it is possible to discriminate whether or not the noteworthy pixel is a pixel on the profile of the image.

The manner in which the profile value E is calculated using the Prewitt filters of FIGS. 6A and 6B will now be described. In an example using the Prewitt filter of FIG. 6A, the profile value E is given by $$E = [[(a \times 1) + (b \times 0) + \{c \times (-1)\} + (d \times 1) + (e \times 0) + \{f \times (-1)\} + (g \times 1) + (h \times 0) + \{i \times (-1)\}]^2 + [(a \times 1) + (b \times 1) + (c \times 1) + (d \times 0) + (e \times 0) + (f \times 0) + \{g \times (-1)\} + \{h \times (-1)\} + \{i \times (-1)\}]^2]^{1/2}.$$

Also in another example using the Prewitt filter of FIG. 6B, the profile value E is obtained in the same way.

The greater the variation among the pixel values of the noteworthy pixel and the adjacent pixels, the greater the profile value E will be obtained.

Then the pixel-on-profile detection section 54 compares the thus obtained profile value E with the predetermined threshold T. If the profile value E is greater than the threshold T, it is judged that the noteworthy pixel (the pixel value e) is a pixel on the profile of the image; this is, the profile has been detected.

The direction-of-profile detection section 55 detects the direction in which the profile of the multilevel input image extends with respect to the noteworthy pixel A. The manner in which the direction-of-profile detection section 55 detects the direction of the profile will be described with reference to FIG. 9, which illustrates various profile directions.

The direction-of-profile detection section 55 makes the following calculations using the pixel values a, b, c, d, e, f, g, h, i in the matrix 100*b* (see FIG. 4), which centers the noteworthy pixel.

$X_1 = b+e+h$ $X_2 = c+e+g$ $X_3 = a+e+i$ $X_4 = d+e+f$

The thus obtained values $X_1$, $X_2$, $X_3$, $X_4$ are compared with one another, and j (j is a natural number representing any of 1, 2, 3, 4) satisfying the following equation:

$X_j = max(X_1, X_2, X_3, X_4)$ is calculated. If two or more of the values $X_1$, $X_2$, $X_3$, $X_4$ are equal to one another, the largest number j is adopted.

Figure 9:
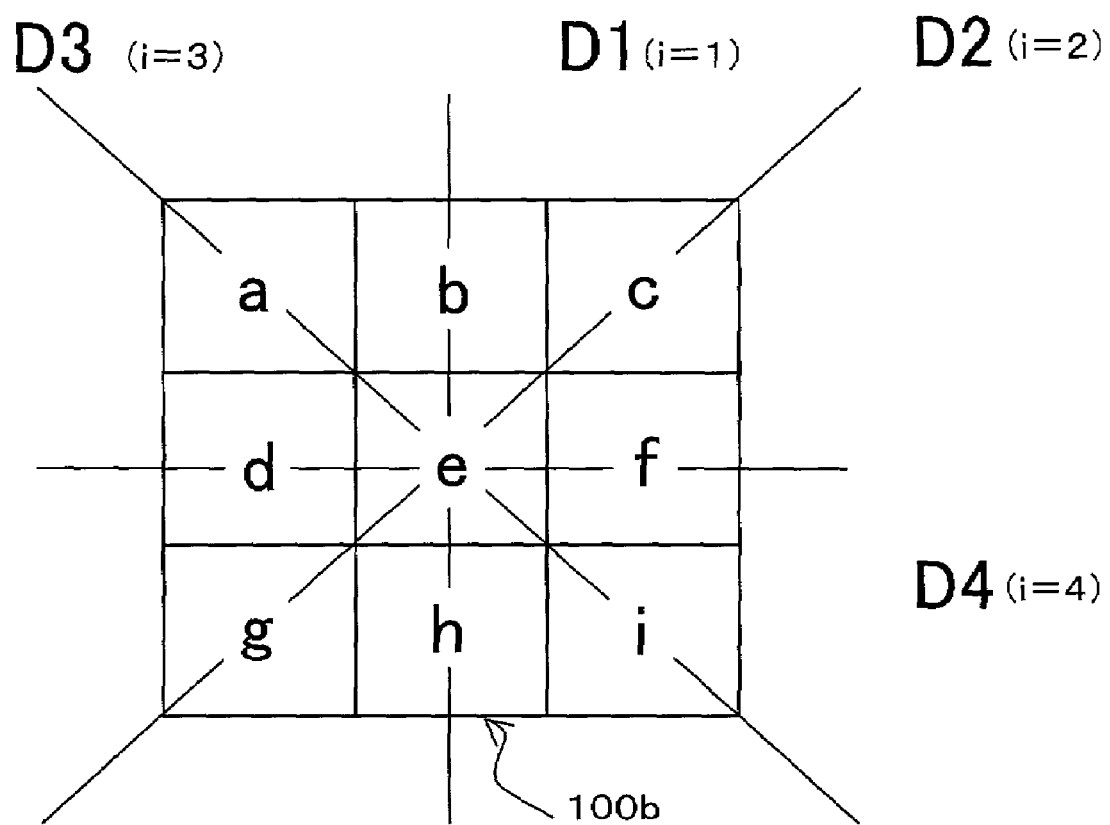
FIG. 9 is a diagram illustrating directions in which profiles extend.

Based on the thus obtained j, the direction-of-profile detection section 55 determines the profile direction $D_j$ ($D_1$, $D_2$, $D_3$, $D_4$) passing over the noteworthy pixel A (pixel value e) as shown in FIG. 9. Specifically in the matrix 100*b*, the direction passing along a string of the pixels b, e, h is designated as the profile direction $D_1$; the direction passing along a string of the pixels c, e, g, the profile direction $D_2$; the direction passing along a string of the pixels a, e, i, the profile direction $D_3$; the direction passing along a string of the pixels d, e, f, the profile direction $D_4$. From these profile directions $D_1$, $D_2$, $D_3$, $D_4$, a particular profile direction $D_j$ is selected.

In the halftoning apparatus of the present embodiment, the two-dimensional digital filter dedicated to enhancing the profile is used to calculate the profile value E. The present invention should by no means be limited to this illustrated example, and various changes or modifications may be suggested without departing from the gist of the invention.

The technique will now be described in which the profile value E is calculated without the two-dimensional digital filter dedicated to enhancing the profile, simultaneously with detecting the profile direction. The alphabetical characters a through i designate the respective pixel values; like reference numbers designate similar parts or elements throughout several views, so their detailed description is omitted here.

(i) In the 3×3 matrix 100*b* of FIG. 4, the following calculations (addition and subtraction) are made:

$X_1 = a+d+g-b-e-h$ $X_2 = c+f+i-b-e-h$ $X_3 = a+b+d-c-e-g$ $X_4 = f+h+i-c-e-g$ $X_5 = b+c+f-a-e-i$ $X_6 = d+g+h-a-e-i$ $X_7 = a+b+c-d-e-f$ $X_8 = g+h+i-d-e-f$ (ii) $X_1$ through $X_8$ are examined one by one to find the maximum of them.

(iii) Based on the result of (ii), the profile direction is determined as follows:
  a) If $X_1$ or $X_2$ is the maximum, the location and the direction of the profile are $D_1$ (FIG. 9).
  b) If $X_3$ or $X_4$ is the maximum, the location and the direction of the profile are $D_2$ (FIG. 9).
  c) If $X_5$ or $X_6$ is the maximum, the location and the direction of the profile are $D_3$ (FIG. 9).
  d) If $X_7$ or $X_8$ is the maximum, the location and the direction of the profile are $D_4$ (FIG. 9).

(iv) The location and the direction of the profile at the time of detection of the maximum are stored in the RAM 16, the magnetic disc 26, or the like.

(v) The maximum of $X_1$ through $X_8$ obtained in (ii) above is multiplied by $256/768$ (=⅓). Then the result is rounded to the nearest whole number and stored in the RAM 16, the magnetic disc 26, or the like.

In this manner, the profile value E can be calculated by making addition and subtraction individually on the values of the noteworthy pixel and the adjacent pixels without the two-dimensional digital filter dedicated to enhancing the profile. Alternatively, the profile value E may be calculated without making any multiplication or division so that the load on the CPU 10 can be decreased, speeding up calculation of the profile value E and, at the same time, detecting the profile direction.

The value "$256/768$" by which the maximum of $X_1$ through $X_8$ is multiplied in (v) above will now be described.

In order to obtain the value $X_i$ (e.g., $X_1$), the value obtained by adding the values of three pixels is subtracted from that obtained by adding the values of the remaining three pixel values (a+d+g−b−e−h). As the pixel values a through i are in the range of from 0 to 255 (8 bits), the maximum and the minimum of $X_i$ (a+d+g−b−e−h) are 765 (=255×3) and 0, respectively.

To control the value $X_i$ using the 8-bit threshold T, the number by which $X_i$ is to be multiplied takes 256/(256× 3=768) as a relatively small normalizing factor.

The error diffusing section 52 diffuses an error Z, which has occurred in the binary value with respect to the noteworthy pixel as the binarizing section 51 performs the binarizing, to unscanned pixels adjacent to the noteworthy pixel, where, $Z = 255-e$ (if $e \geq 128$)

$Z = e$ (if $e < 128$)

(e: the pixel value of the noteworthy pixel).

More specifically, the error diffusing section 52 diffuses the error Z to the unscanned pixels adjacent to the noteworthy pixel A by one diffusion technique. The occurred error Z with respect to the noteworthy pixel A is proportionally distributed to the plural unscanned pixels adjacent to the noteworthy pixel e in accordance with a weighting pattern (weighting factors) as of FIGS. 10 and 11.

FIGS. 10A through 10D, show the weighting patterns of the error diffusion technique: in what ratio the error Z with respect to the noteworthy pixel A, which is designated by ● in FIGS. 10A through 10D, is distributed to the unscanned pixels adjacent to the noteworthy pixel A.

The error diffusing based on the weighting pattern of FIG. 10A will now be described. For example, if the pixel value e of the noteworthy pixel A is e=100 (e<128), the error Z=100; consequently 100×7/16 is added to an unscanned pixel (pixel value f in FIG. 4) neighboring the noteworthy pixel A in the primary scanning direction.

Likewise, 100×5/16 is added to another unscanned pixel (pixel value h in FIG. 4) neighboring the noteworthy pixel A in the secondary scanning direction (perpendicular to the primary scanning direction); 100×1/16, still another unscanned pixel (pixel value i in FIG. 4) neighboring the noteworthy pixel A in the primary scanning direction; 100× 3/16, a further unscanned pixel (the pixel value g in FIG. 4) neighboring the noteworthy pixel A in the primary scanning direction. As a result, the occurred error is proportionally distributed (diffused) to the unscanned pixels adjacent to the noteworthy pixel A.

Figure 10A:
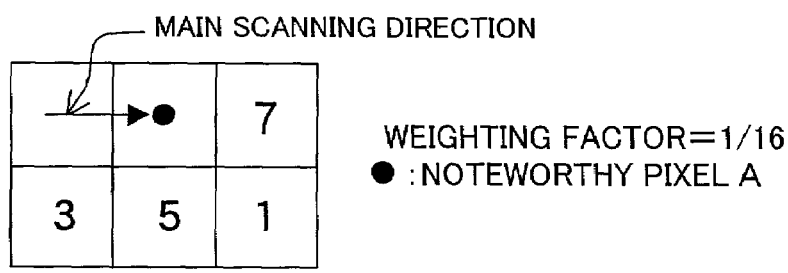
FIGS. 10A through 10D are diagrams each showing a weighting pattern according to an error diffusion technique.
Figure 10B:
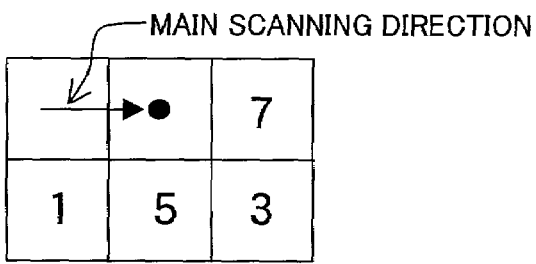
Figure 10C:
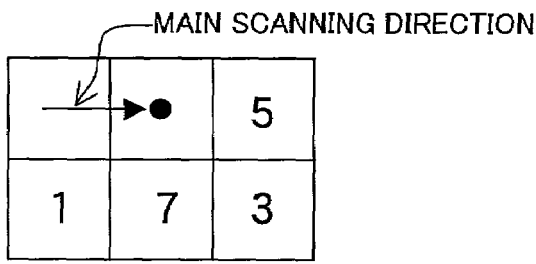
Figure 10D:
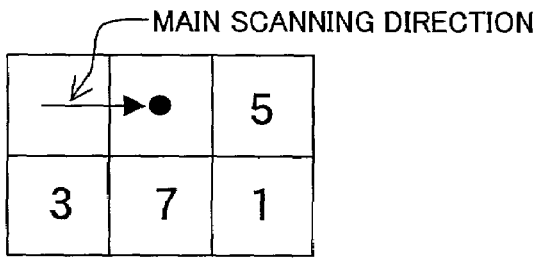

In addition, the error diffusing section 52 has also other weighting patterns as of FIGS. 10B through 10D, so that the error Z can be proportionally distributed to the unnscanned pixels adjacent to the noteworthy pixel A based on these plural (4 in the present embodiment) types of weighting patterns, thus realizing the error diffusing.

Also when using the weighting patterns of FIGS. 10B through 10D, the error diffusing section 52 performs the error diffusing in the same manner as when using the weighting pattern of FIG. 10A.

Further, when the pixel-on-profile detection section 54 detects that the noteworthy pixel A is a pixel constituting part of a profile of the multilevel input image, the error diffusing section 52 may perform an exceptional process as described below.

As this exceptional process, values according to the occurred error Z are added to the values of the unscanned pixels along the profile in the detected direction, which is detected by the direction-of-profile detection section 54. Specifically, the error diffusing section 52 decides the profile direction $D_j$, which has been detected by the direction-of-profile detection section 54, and then performs the following processes in accordance with the decision.

(i) If the profile direction is $D_1$, Z/2 is added to the pixel value h.
(ii) If the profile direction is $D_2$, Z/2 is added to the pixel value g.
(iii) If the profile direction is $D_3$, Z/2 is added to the pixel value i.
(iv) If the profile direction is $D_4$, Z/2 is added to the pixel value f.

In the present embodiment, the value obtained by dividing the error Z by 2 is added to the pixel value of the unscanned pixel along the profile direction. The present invention should by no means be limited to this, and various changes or modifications may be suggested without departing from the gist of the invention. As an alternative example, the value obtained by dividing the error Z by a number other than 2 may be added to the pixel value of the unscanned pixel along the profile in the detected direction in accordance with printing conditions such as the quality of ink (toner) or a printing medium to be used.

Meanwhile, binarizing is realized without error diffusing by the error diffusion section 52 in the halftoning apparatus of the present embodiment. Such binarizing will be hereinafter called "simple threshold (binarizing) method".

The error diffusion technique changing section 53 changes the technique of the error diffusing, which is currently used by the error diffusing section 52, to another in accordance with a predetermined way as the scanning of the pixels of the multilevel input image progresses. For example, the plural weighting patterns of FIGS. 10A through 10D are selectively changed from one to another in the sequence of A, B, C, D, A, B .... Namely, the error diffusion technique changing section 53 makes such change by changing the weighting pattern currently used in the error diffusing section 52 to another that is selected in the predetermined sequence. Alternatively the weighting patterns may be changed at random.

Furthermore, the error diffusion technique changing section 53 changes the error diffusion technique when the pixel-on-profile detection section 54 determines that the noteworthy pixel is a pixel constituting part of the profile of the image (for example, the noteworthy pixel is around the profile). Otherwise the error diffusion technique changing section 53 changes the error diffusion technique for every pixel.

The way of change of error diffusion technique by the error diffusion technique changing section 53 is exemplified by (1) changing the weighting pattern, and (2) changing the error diffusion technique itself; either changing way may be selected according to the need. In the present embodiment, the changing of the error diffusion technique by the error diffusion technique changing section 53 can be omitted to perform the error diffusing with one particular technique.

Figure 12:
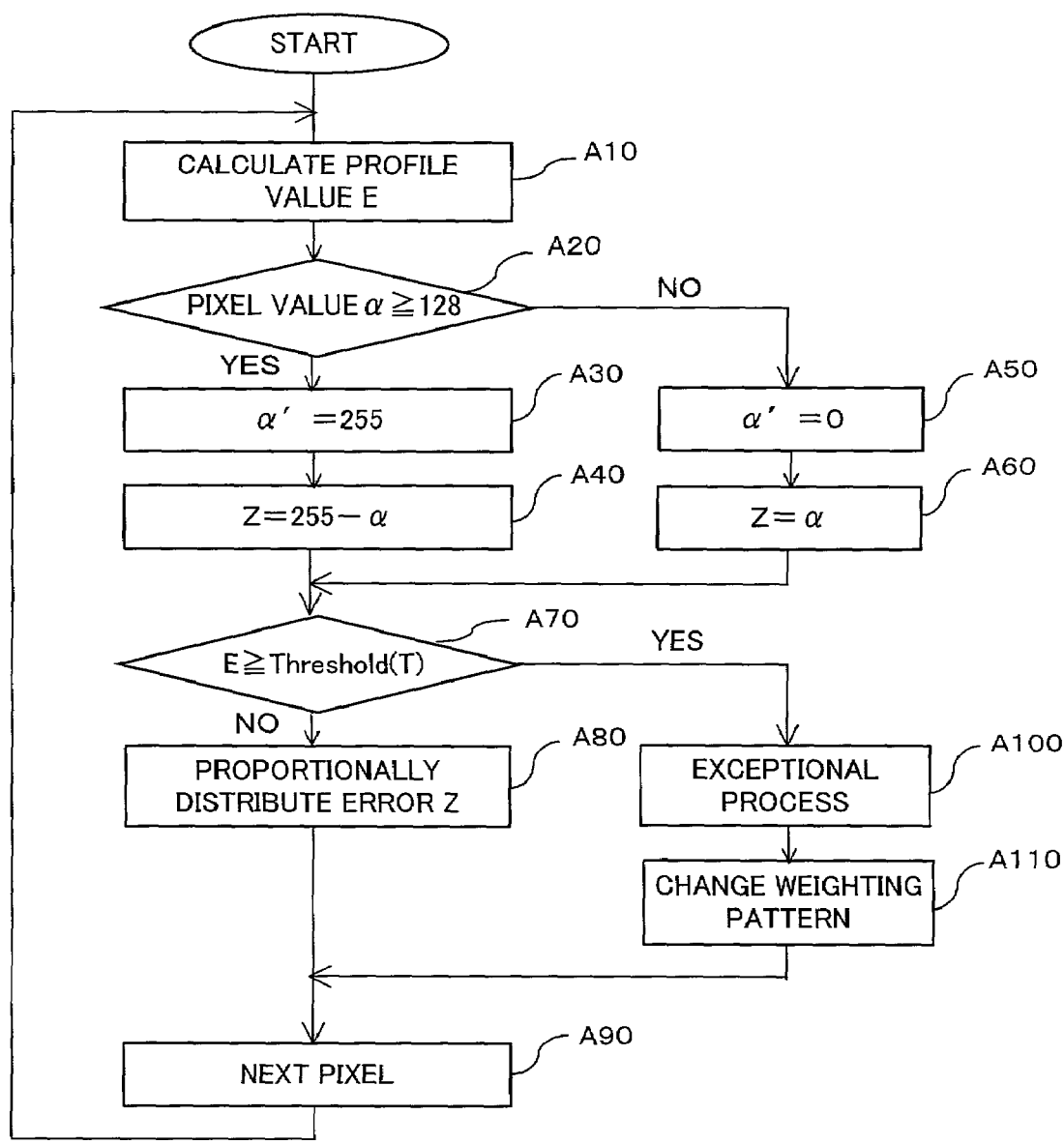
FIG. 12 is a flowchart illustrating the operation of the halftoning apparatus of the present embodiment to change the error diffusion technique (weighting pattern) across the profile.

The operation of the individual element or part of the halftoning apparatus of the present embodiment during the change of the error diffusion technique (weighting pattern) around the profile will now be described with reference to the flowchart of FIG. 12, steps A10 through A110.

First of all, the halftoning apparatus binarizes the multilevel image data expanded on the RAM 16 while scanning the image data using the matrix 100b, which centers the noteworthy pixel A, as shown in FIG. 4. At that time, in the matrix 100b, the pixel-on-profile detection section 54 first calculates the profile value E with respect to the noteworthy pixel A based on both the multilevel value of the noteworthy pixel A and those of the adjacent pixels, by using the two-dimensional digital filter dedicated to enhancing the profile, such as the Laplacian filters of FIGS. 5A and 5B, or the Prewitt filters of FIGS. 6A and 6B, or by making addition and subtraction individually on the multilevel values of the noteworthy pixel A and the adjacent pixels for direct calculation (step A10).

Then, the binarizing section 51 compares the estimated value α of the noteworthy pixel A, which is calculated by the estimating section 56, with the predetermined value (128 in the present embodiment) (step A20). If the estimated value α is equal to or larger than 128 (α≧128) (the YES route of step A20), 255 is recorded as the pixel value α' of the noteworthy pixel A in a predetermined area of the RAM 16 or the magnetic disc 26 (step A30).

And, 255 minus α is calculated. The result of this calculation is recorded as the error Z in the predetermined area of the RAM 16 or the magnetic disc 26 (step A40).

Otherwise if the estimated value α is smaller than 128 (e<128) (the NO route of step A20), the binarizing section 51 records 0 as the pixel value α' of the noteworthy pixel A in the predetermined area of the RAM 16 or the magnetic disc 26 (step A50); and the binarizing section 51 records the estimated value α of the noteworthy pixel A as the error Z in the predetermined area of the RAM 16 or the magnetic disc 26 (step A60).

Next the pixel-on-profile detection section 54 compares the profile value E with a preset threshold T (step A70). If the profile value E is smaller than the threshold T (the NO route of the step A70), the error diffusing section 52 proportionally distributes the error Z to the plural unscanned pixels in accordance with the weighting pattern of the current error diffusion technique (step A80).

On the contrary, if the profile value E is equal to or larger than T (see the YES route of step A70), the exception process is carried out (step A100); namely, the profile direction $D_j$ is detected by the direction-of-profile detection section 55, and then the values (Z/2) corresponding to the occurred error are added to the pixel values of the unscanned pixels along the profile in the detected direction.

After that, the error diffusion technique changing section 53 selectively changes the weighting pattern from one to another among the plural weighting patterns of FIGS. 10A through 10D, (for example, in the sequence of A, B, C, D, A, B . . . in FIG. 10) (step A110).

After completion of step A80 or A110, for the multilevel image data expanded on the RAM 16, the halftoning apparatus shifts the matrix 100b so as to center the next noteworthy pixel (the pixel next to the current noteworthy pixel in the scanning direction) (step A90), and then returns to step A10 to repeat the same processes for a newly given noteworthy pixel.

In the present embodiment, as mentioned above, the change of the error diffusion technique by the error diffusion technique changing section 53 is made by selecting one from the plural weighting patterns of FIGS. 10A through 10D, in the sequence of A, B, C, D, A, B . . . . Alternatively selection from the plural weighting patterns of FIGS. 10A through 10D, may be at random.

In the halftoning apparatus of the present embodiment, the error diffusion technique changing section 53 changes the error diffusion technique only when the pixel-on-profile detection section 54 judges that the noteworthy pixel A is a pixel on the profile of the input multilevel image. Alternatively the change of the error diffusion technique may be made for every pixel. In this case also, a desired error diffusion technique (weighting pattern) may be selected from the plural candidates at random.

Figure 13:
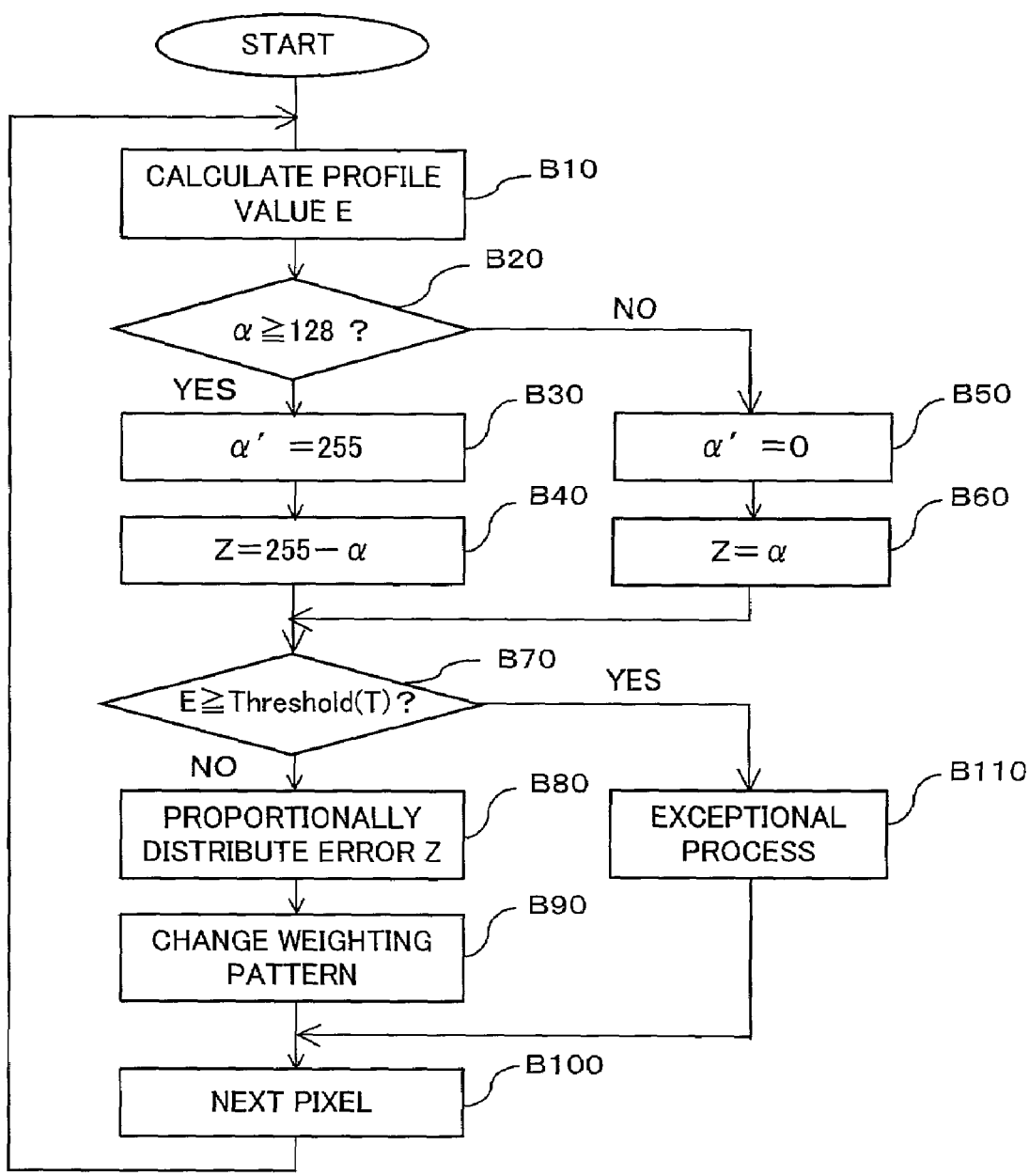
FIG. 13 is a flowchart illustrating the operation of the halftoning apparatus of the present embodiment to change the error diffusion technique (weighting pattern) for every pixel.

The operation of the individual element or part of the halftoning apparatus during the change of the error diffusion technique (weighting pattern) for every pixel will now be described with reference to the flowchart of FIG. 13, steps B10 through B110.

First of all, the halftoning apparatus binarizes the multilevel image data expanded on the RAM 16 while scanning the image data using the matrix 100b of FIG. 4, which centers the noteworthy pixel. At that time, in the matrix 100b, the pixel-on-profile detection section 54 first calculates the profile value E with respect to the noteworthy pixel based on both the multilevel value of the noteworthy pixel and those of the adjacent pixels, by using the two-dimensional digital filter dedicated to enhancing the profile, such as the Laplacian filter (FIGS. 5A and 5B) or the Prewitt filter (FIGS. 6A and 6B), or by making addition and subtraction individually on the multilevel values of the noteworthy pixel A and the adjacent pixels for direct calculation (step B10).

Then the binarizing section 51 compares the estimated value α of the noteworthy pixel A, which is calculated by the estimating section 56, with the predetermined value (128 in the present embodiment) (step B20). If the estimated value α is equal to or larger than 128 (α≧128) (the YES route of step B20), 255 is recorded as the pixel value α' of the noteworthy pixel A in a predetermined area of the RAM 16 or the magnetic disc 26 (step B30).

And, 255 minus α is calculated, and the result of this calculation is recorded as the error Z in the predetermined area of the RAM 16 or the magnetic disc 26 (step B40).

Otherwise if the pixel value α is smaller than 128 (α<128) (the NO route of step B20), the binarizing section 51 records 0 as the pixel value α' of the noteworthy pixel A in the predetermined area of the RAM 16 or the magnetic disc 26 (step B50); and the binarizing section 51 records the estimated value α of the noteworthy pixel as the error Z in the predetermined area of the RAM 16 or the magnetic disc 26 (step B60).

Next the pixel-on-profile detection section 54 compares the profile value E with a preset threshold T (step B70). If the profile value E is smaller than the threshold T (the NO route of the step B70), the error diffusing section 52 proportionally distributes the error Z to the plural unscanned pixels adjacent to the noteworthy pixel A in accordance with the weighting pattern of the current error diffusion technique (step B80).

After that, the error diffusion technique changing section 53 selectively changes the plural weighting patterns of FIGS. 10A through 10D, one after another (e.g., in the sequence of A, B, C, D, A, B . . . ) (step B90).

On the contrary, if the profile value E is equal to or larger than T (see the YES route of step B70), the exception process is carried out (step B110); namely, the profile direction $D_j$ is detected by the direction-of-profile detection section 55 and then the values (Z/2) corresponding to the occurred error are added to the pixel values of the unscanned pixels along the profile in the detected direction.

After completion of step B90 or B110, for the multilevel image data expanded on the RAM 16, the halftoning apparatus shifts the matrix 100b so as to center the next noteworthy pixel A (step B100), and then returns to step B10 to repeat the same processes for a newly given noteworthy pixel A.

As also mentioned above, the error diffusion technique (the weighting pattern) is changed for every pixel, thus minimizing moiré and artifacts in the binary image, which did not appear in the original (multilevel) image.

How to change the current error diffusion technique to another will now be described with reference to FIGS. 11A and 11B. FIG. 11A illustrates the weighting pattern of the error diffusion technique by Javis, Judice and Ninke, while FIG. 11B illustrates the error diffusion technique by Stucki.

Figure 11A:
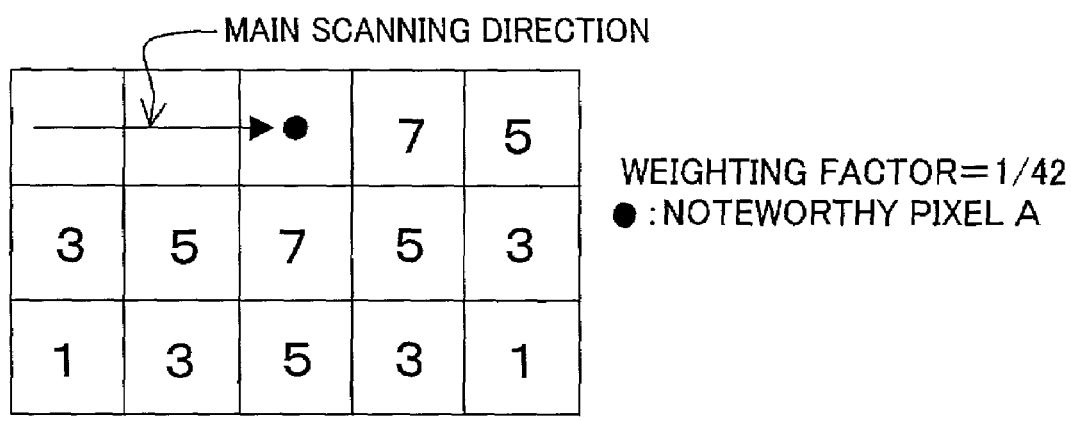
FIG. 11A is a diagram showing a weighting pattern according to Javis, Judice, and Ninke.
Figure 11B:
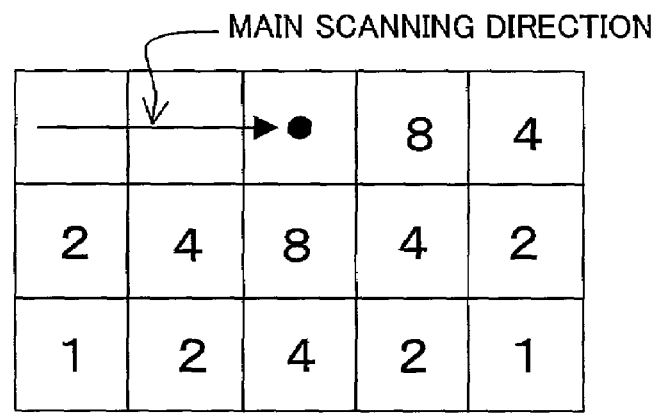
FIG. 11B is a diagram showing a weighting pattern according to Stucki.

In these error diffusion techniques of FIGS. 11A and 11B, error Z proportionally distributes to the noteworthy pixel and the unscanned pixels adjacent to the noteworthy pixels. In these techniques the area of pixels to which the error Z is distributed is enlarged as compared to the error diffusion technique of FIG. 10.

The weighting pattern of FIG. 11A is known as the error diffusion technique of Javis, Judice and Ninkes, while that of FIG. 11B is known as the error diffusion technique of Stucki.

In these techniques, the error diffusing section 52 proportionally distributes (diffuses) the error Z using either the weighting pattern of FIG. 11A or that of FIG. 11B. And the error diffusion technique changing section 53 changes the weighting patterns one another. The remaining processes are substantially identical with those illustrated in the flowchart of FIG. 12, steps A10 through A110.

With this arrangement, scanning the pixels contained in the multilevel input image, the halftoning apparatus of the present embodiment converts (binarizes) the multilevel pixel values of the image data into the binary values for every noteworthy pixel A being currently scanned.

Here, the profile detection process and the binarizing process carried out in the halftoning apparatus of the present embodiment will now be described with reference made to the flowchart (step C10 to C120) of FIG. 14.

First of all, the operator inputs on the operation panel a threshold T as a preset parameter controlling the degree of profile enhancement (step C10), whereupon the halftoning apparatus starts raster scanning (step C20).

At that time, the binarizing may start from any of four pixels respectively located at four corners of the input image, and may progress in a desired direction.

Then discrimination is made whether or not the scanning has been completed (step C30); if the result of this discrimination is positive (the YES route of step C30) the operation of the halftoning apparatus is terminated.

Otherwise if the scanning is to be continued (the NO route of step C30), the halftoning apparatus selects one particular way from the plural profile detection ways; i.e. (1) using the two-dimensional digital filter dedicated to enhancing the profile, and (2) directly calculating from the pixel values (step C40). Alternatively the profile detection way maybe selected by the operator.

Here, if a Laplacian filter (the two-dimensional digital filter dedicated to enhancing the profile) is selected to use, the profile value E is calculated using the Laplacian filter as mention above, and the obtained profile value E is compared with the threshold T for judgment that the noteworthy pixel A being currently scanned is a pixel constituting part of the profile of the image (step C50).

Likewise, if a Prewitt filter (the two-dimensional digital filter dedicated to enhancing the profile) is selected to use, the profile value E is calculated using the Prewitt filter as mentioned above, and the obtained profile value E is compared with the threshold T for judgment that the noteworthy pixel A being currently scanned is a pixel constituting part of the profile of the image (step C60).

When the direct calculation from the pixel values is selected, the profile value E is calculated by making addition and subtraction individually on the multilevel values of the noteworthy pixel A and the adjacent pixels, and then the obtained profile value E is compared with the preset threshold T for judgment that the noteworthy pixel A being currently scanned is a pixel constituting part of the profile of the image (step C70).

Next, the halftoning apparatus selects the method of halftoning (step C80). Specifically, a particular one is selected from the following three halftoning methods: with plural weighting patterns of the error diffusion technique provided in advance, (1) changing the weighting pattern only upon detection that the noteworthy pixel A being currently scanned is a pixel on the profile of the image (only upon encountering of the profile); (2) changing the weighting patterns one to another for every pixel; and (3) changing the weighting pattern to that of another error diffusion technique as shown in FIGS. 11A and 11B.

If the method (1) above is selected (step C90), one identical weighting pattern is constantly used in halftoning the pixels lying between one profile and the other profile. At that time, the weighting pattern is preferably changed either in a predetermined sequence or at random.

Otherwise if the method (2) above is selected (step C100), the weighting pattern is changed for every pixel; at that time, the weighting pattern is preferably changed either in a predetermined sequence or at random.

Still otherwise if the method (3) is selected, the halftoning is performed using such error diffusion methods as shown in FIGS. 11A and 11B (step C110).

After that, for the multilevel image data expanded on the RAM 16, the halftoning apparatus shifts the matrix 100 so as to center the next noteworthy pixel (step C120), and then returns to step C30.

Subsequently the processes (steps C10 to C120) are repeated until the raster scanning is completed.

Figure 15:
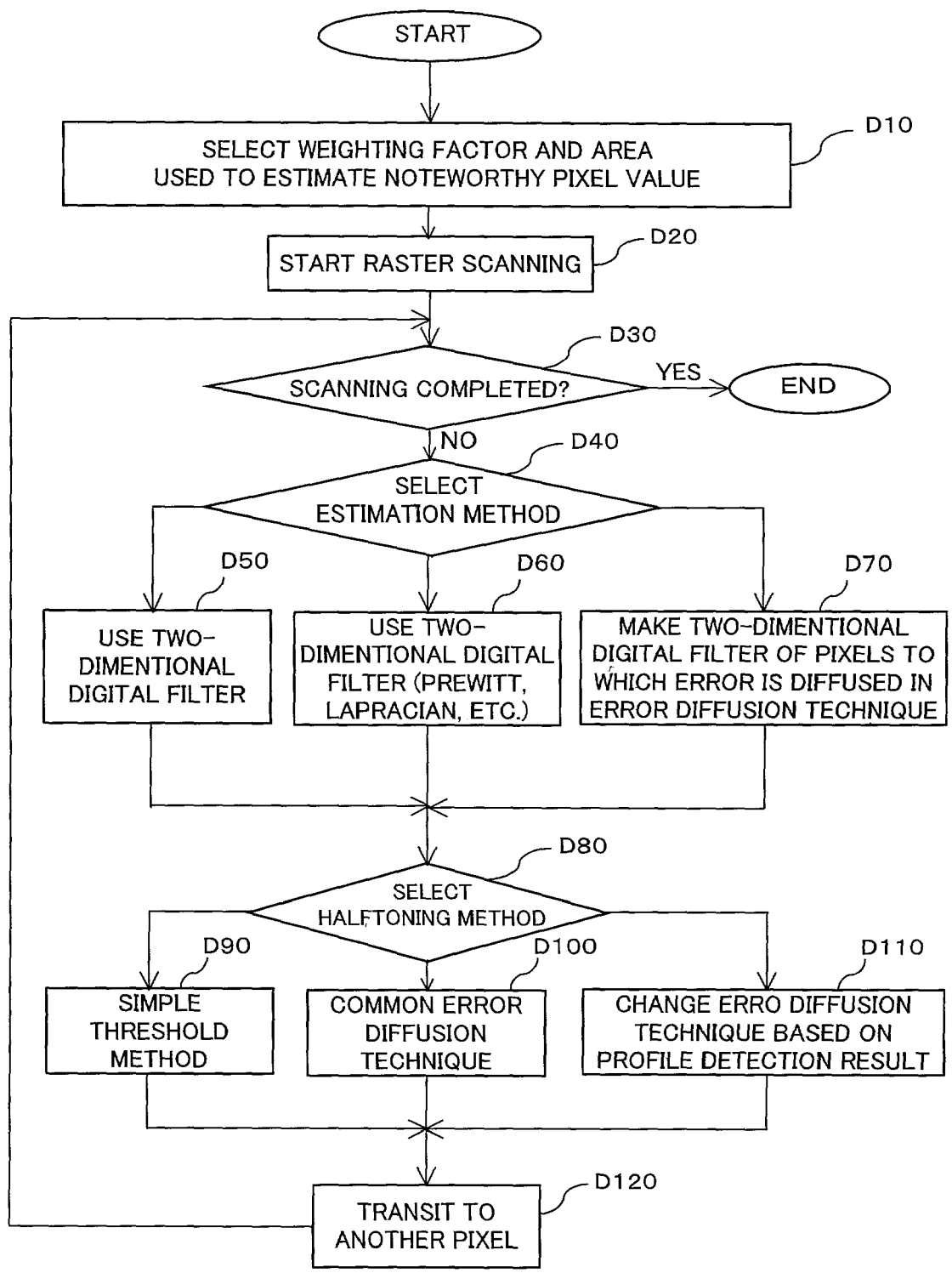
FIG. 15 is a flowchart illustrating the operation of the halftoning apparatus of the present embodiment.

Next, the entire operation, including pixel value estimation, of the halftoning apparatus of the present embodiment will now be described with reference made to the flow chart (steps D10 to D120) of FIG. 15.

First of all, an operator inputs a weighting factor and an area to be used for estimating the multilevel value of the noteworthy pixel A through a keyboard 20 or a mouse 22 (step D10), whereupon the halftoning apparatus starts raster scanning (step D20)

At that time, binarizing process may start from any of four pixels respectively located at four corners of the input image, and may progress in a desired direction.

Then discrimination is made whether or not the scanning has been completed (step D30); if the result of this discrimination is positive (the YES route of step D30) the operation of the halftoning apparatus is terminated.

Otherwise if the scanning is to be continued (the NO route of step D30),the halftoning apparatus selects one particular way from the above-mentioned three ways of calculating the estimated value α (step D40). Alternatively the calculation way may be selected by the operator.

Here, upon selection of the use of a two-dimensional digital filter other than the digital filter dedicated to enhancing the profile, the estimated value α is calculated with the two-dimensional digital filter in the same manner as described above under the caption of "First Estimating Method" (step D50).

Otherwise if the two-dimensional digital filter dedicated to enhancing the profile is selected to use, the estimated value α is calculated using the Laplacian filter or the Prewitt filter in the same manner as described above under the caption of "Second Estimating Method" (step D60).

Still otherwise if selected the calculation based on the values of non-binarized pixels to which the error is diffused, the estimated value α is calculated, applying the two-dimensional digital filter to those non-binarized pixels, in the same manner as described above under the caption of "Third Estimating Method" (step D70).

Next, the halftoning apparatus selects the method of halftoning (step D80). Specifically, a particular one is selected from the following three types of halftoning methods: (1) the simple threshold method; (2) the method in which a common error diffusion technique is used; (3) the method in which the profile detection (shown in FIG. 14) is performed before error diffusing.

Upon selection of the above method (1) (step D90) the binarizing section 51 binarizes the estimated multilevel value α, which is calculated by the estimating section 56 as the pixel value of the noteworthy pixel A. At that time, the error {the difference between the post-binarizing pixel value α' (=0 or 255) and the estimated value α} accompanying the binarizing is not diffused (simple threshold method).

Otherwise if the above method (2) is selected (step D100), the binarizing section 51 binarizes in the simple threshold method the estimated value α, which is calculated by estimating section 56 as the pixel value of the noteworthy pixel A, whereupon the error diffusion section 52 diffuses the error {the difference between the pixel value α' (=0 or 255) after binarized and the estimated value α} accompanying the binarizing by using a well-known error diffusion technique.

Figure 14:
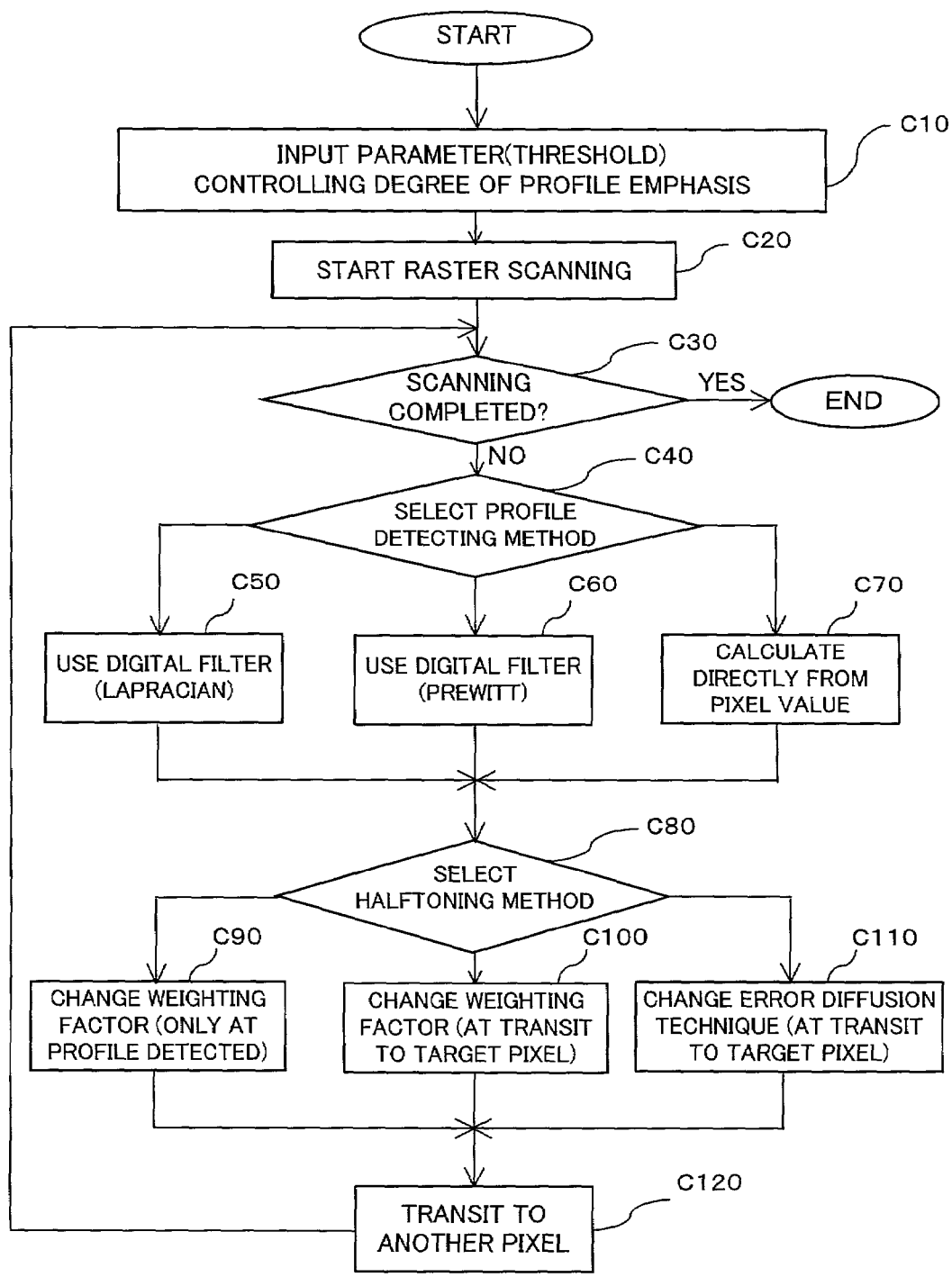
FIG. 14 is a flowchart illustrating the profile detection and the binarizing process carried out in the halftoning apparatus of the present embodiment.

Still otherwise if the above method (3) is selected (step D110), the binarizing section 51 binarizes in the simple threshold method the estimated value α, which is calculated by estimating section 56 as the pixel value of the noteworthy pixel A, whereupon steps C40 to C110 of the flowchart of FIG. 14 are performed. In this case, "weighting factor and area used to estimate the noteworthy pixel A" has been input in advance.

After that, for the multilevel image data expanded on the RAM 16, the halftoning apparatus shifts the matrix 100b so as to center the next noteworthy pixel A (step D120), and then returns to step D30.

Subsequently the processes (step D10 through d120) are repeated until the raster scanning is completed.

As described above, when converting the multilevel value of the noteworthy pixel A into a binary value, the value to be converted is not the noteworthy pixel A itself but the estimated pixel value α, which is calculated based on other pixel values than that of the noteworthy pixel A. It is thus possible to soften the sudden shift in the pixel values even in a patterned image, such as a checkered one, in which neighboring two pixels can greatly differ in pixel values.

The softening of the sudden shift in the pixel values reduces bands (moiré, etc.) that appear in a halftoned image along the scanning direction, which bands are due to the sudden shift in the pixel values in an original image.

Further, even if some pixels have outstanding pixel values due to image defects, significant errors risen from the outstanding value are prevented from being directly diffused to unprocessed adjacent pixels. It is thus possible to minimize moiré and other artifacts that did not appear in the original (multilevel) image. Also, even if the original image contains latent, not visually apparent, moiré, which is due to the periodic structure typical of an input device (scanner, digital camera, etc), it is prevented that the moiré is enhanced by error diffusing to resultantly become visually apparent in the halftoned image. Moreover, even in a very gentle tone-gradation image, a peculiar artifact that tends to appear in such an image can be successfully prevented.

The use of a two-dimensional digital filter facilitates the calculation of the estimated value α. In particular, a two-dimensional digital filter dedicated to enhancing the profile, such as the Lapracian filter or the Prewitt filter, provides a sharp, profile-enhanced appearance in the processed image, thereby producing a visually appealing image.

Further, since the calculation of the estimated value α is performed by the estimating section 56 in parallel with the binarizing process by the binarizing section 51, it is possible to reduce the processing time.

Furthermore, when the pixel-on-profile detection section 54 detects that the noteworthy pixel is contained in the profile of the input image, the error diffusion technique changing section 53 changes the error diffusion technique (weighting pattern) to another. Thus, it is possible to localize the undesirable effects (moiré and artifacts), which have been presumably caused by changing the error diffusion technique, to dissolve into the profile Thus, minimizing moiré and artifacts in the binary image, that did not appear in the original (multilevel) image. Further, when the pixel-on-profile detection section 54 detects that the noteworthy pixel is contained in the profile of the input image, the error diffusing section 52 performs the exception process of adding values (Z/2) to the values of the unscanned pixels along the profile in the direction detected by the direction-or-profile detection section 55, in accordance with the error occurred with the binarizing of the noteworthy pixel. It is accordingly possible to minimize moiré and artifacts in the binary image, which did not appear in the original (multilevel) image.

Still further, discrimination is made whether or not the noteworthy pixel is a pixel on the profile, by comparing the profile value E with respect to the noteworthy pixel, which is calculated based on the values of the noteworthy pixel and its adjacent pixels, to the threshold T (e.g., 128). Accordingly it is possible not only to facilitate detecting the profile but also to enable detecting the profile while scanning the multilevel image, realizing a high-speed profile detecting process.

Further, with the halftoning apparatus of the present embodiment, the operator can change the degree of profile enhancement (sharpness) in the binary image by changing the threshold T, thereby obtaining printed matter devoid of a blur, which would have been caused in the conventional halftoning.

For example, the closer the threshold T to 255, the more the profile will be enhanced; the closer the threshold T to 0, the more the profile will be blurred.

Furthermore, the pixel-on-profile detection section 54 employs the two-dimensional filter dedicated to enhancing the profile, such as a Laplacian filter or a Prewitt filter to calculate the profile value, thus facilitating detection of the profile.

In addition, as the error diffusing section 52 proportionally distributes the occurred error to the plural (4 in the present embodiment) unscanned pixels adjacent to the noteworthy pixel based on the weighting patterns as shown in FIGS. 7A through 7D, the error diffusion technique changing section 53 selects one from the candidate weighting patterns in the sequence of A, B, C, D, A, B . . . in FIG. 7. The selection of the error diffusion technique is made by changing the weighting pattern to be used by the error diffusing section 52 in the predetermined sequence, thus minimizing moiré and artifacts in the binary image, which did not appear in the original (multilevel) image.

Moreover, as the error diffusing section 52 proportionally distributes the occurred error to the plural unscanned pixels adjacent to the noteworthy pixel based on the weighting patterns as shown in (a) trough (d) of FIG. 7, the error diffusion technique changing section 53 changes the weighting pattern to another as selected at random from the above weighting patterns, thus minimizing moiré and artifacts in the binary image, which did not appear in the original (multilevel) image.

Figure 16:
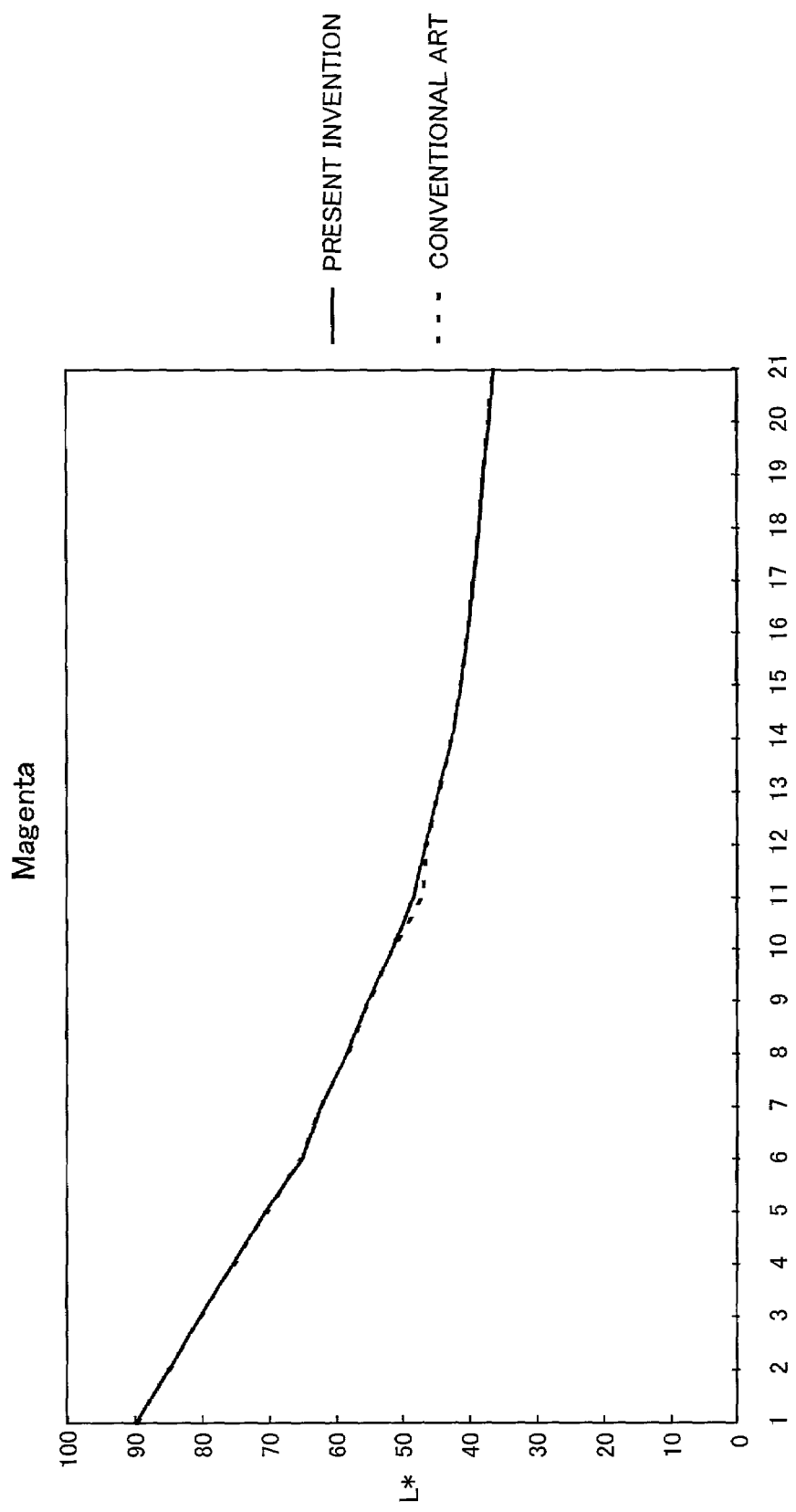
FIG. 16 is a graph showing the relation between the wavelengths and the luminance for magenta.
Figure 17:
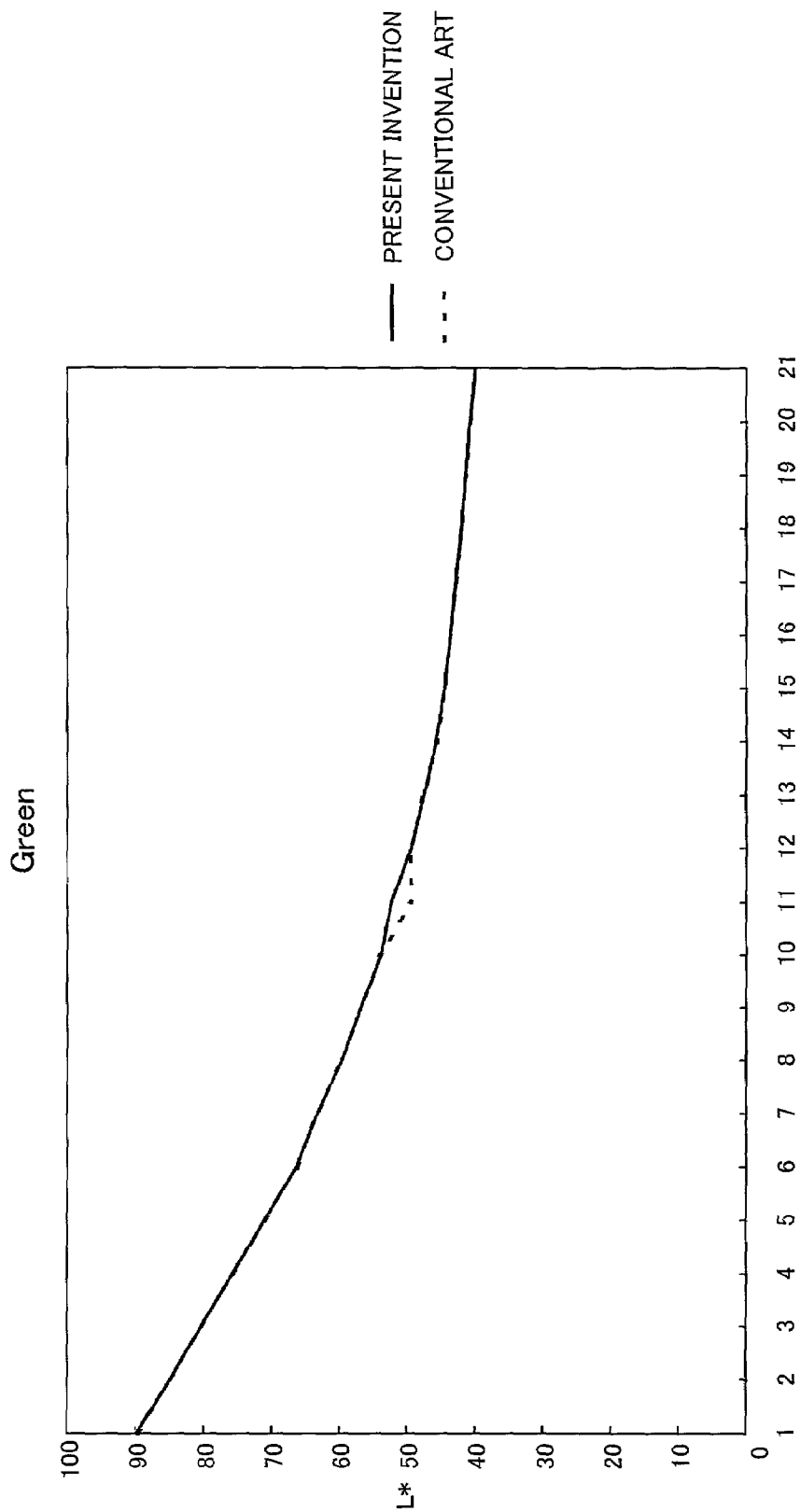
FIG. 17 is a graph showing the relation between the wavelengths and the luminance for green.
Figure 18:
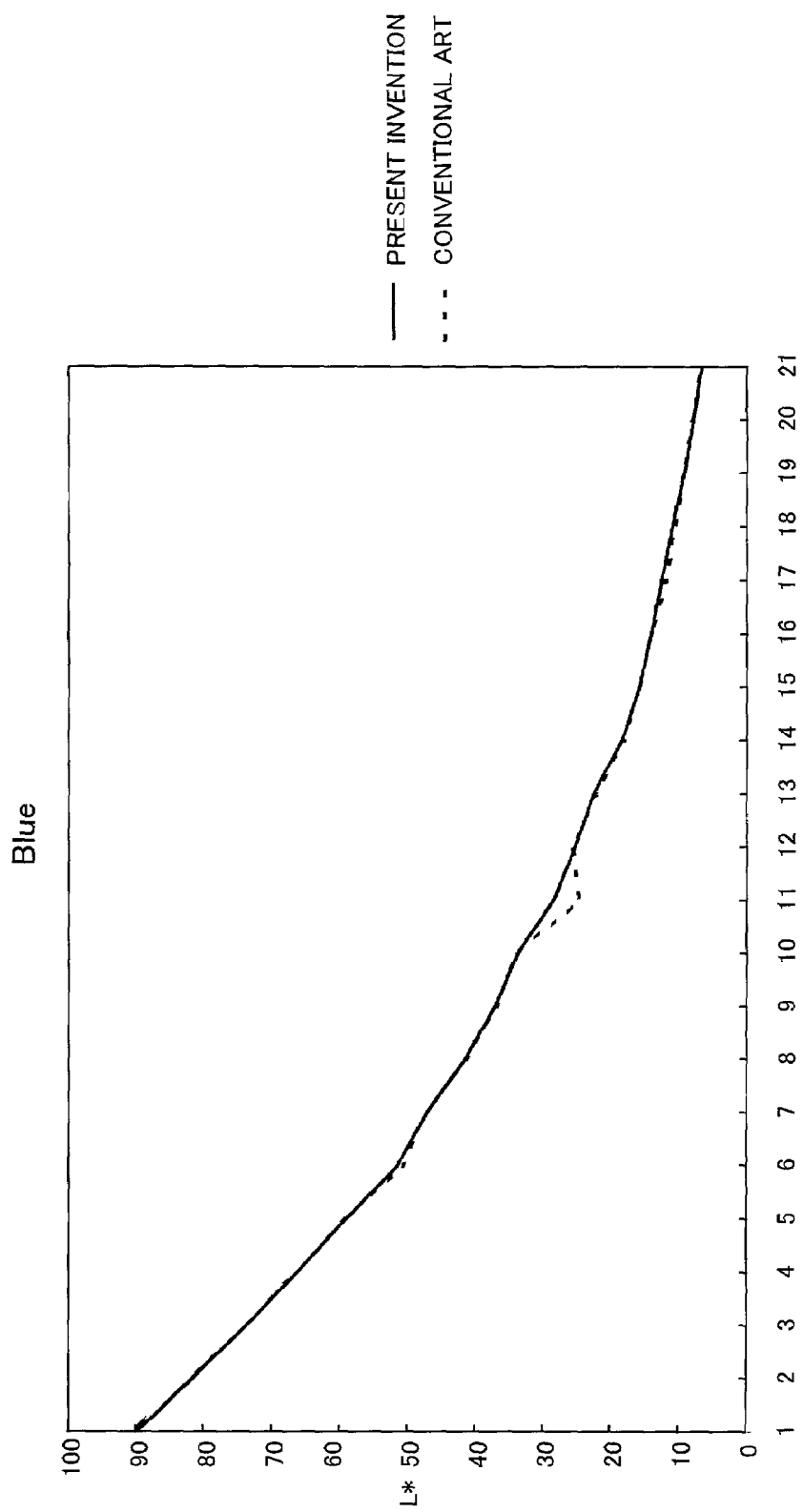
FIG. 18 is a graph showing the relation between the wavelengths and the luminance for blue.
Figure 19:
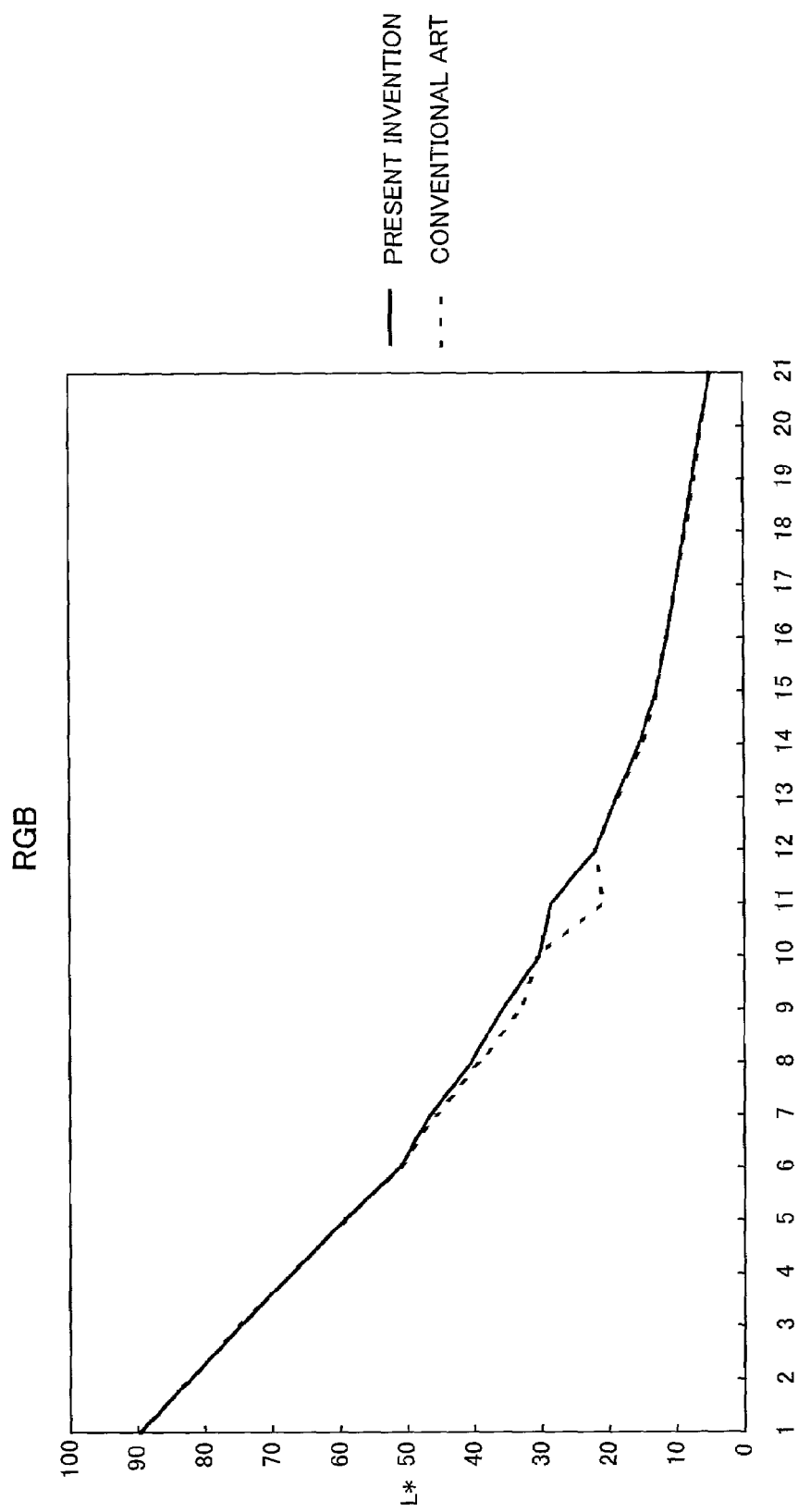
FIG. 19 is a graph showing the relation between the wavelengths and the luminance for composite black (equal in RGB levels).

FIGS. 16 through 19 are graphs each showing the luminance (L*) of color chips of the image halftoned by the halftoning apparatus of the present embodiment; the luminance, which was measured for every 5% throughout the range of from 0% to 100%, is graphed in comparison with a conventional halftoning method in which the pixel value of the noteworthy pixel itself is binarized. FIG. 16 shows the relation between the wavelengths and the luminance for magenta; FIG. 17, for green; FIG. 18, for blue; FIG. 19, for composite black (equal in RGB levels) In FIGS. 16 through 19, the solid line shows the result of the present embodiment; the broken line, the result of the conventional art.

As shown in FIGS. 16 through 19, the luminance falls near color chip No. 11 (50%) in the conventional halftoning method, whereas no such drop of the luminance appears in the halftoning method and apparatus of the present embodiment, guaranteeing a smoother halftoned image.

When the multilevel image to be binarized is constituted with a plurality of images (e.g., a color image composed of a plurality of color separations such as cyan, magenta, yellow, and black) to be halftoned, sharing a substantially identical profile, the pixel-on-profile detection section 54 may discriminate whether or not the noteworthy pixel is a pixel on the profile for only one of the plural images; and the result of this discrimination is temporarily stored in the RAM 16 or the magnetic disc 26, and the profile information (location or direction of the profile) may be used in halftoning all the images.

All the plural images can be thereby halftoned without the need for the pixel-on-profile detection section 54 to perform the pixel-on-profile detection for the remaining images, thus speeding up the halftoning process.

The plural images constituting the color image should by no means be limited to cyan, magenta, yellow, and black as described above, but they may be red, green, and blue; other color separations also are applicable. Also any combination of colors constituting a color image is applicable.

At that time, the binarizing all the images may be performed after completion of the profile detection or simultaneously with it.

Further, in the halftoning apparatus of the present embodiment, as the multilevel image is scanned, the pixel-on-profile detection section 54 calculates the profile value E to discriminate whether or not the noteworthy pixel is a pixel on the profile, simultaneously with the binarizing performed by the binarizing section 51, thus reducing the time needed for halftoning.

Since the halftoning method of the present embodiment is suitable for an parallel processing operation, parallel processing using plural CPUs can be realized, thus speeding up the halftoning processes of a huge amount of image data.

When the pixel-on-profile detection section 54 carries out the profile detection, any one technique may be employed as selected from (1) using a Laplacian filter, (2) using a Prewitt filter, and (c) making addition and subtraction on the pixel values of the noteworthy pixel and the adjacent pixels.

Furthermore, the present invention should by no means be limited to these embodiments, and various changes and modifications maybe made without departing from the gist of the invention.

For example, in profile detection by the pixel-on-profile detection section 54, other techniques than those used in the present embodiment may be used with the same results.

And to calculate the profile value E by making addition and subtraction on the pixel values of the noteworthy pixel and the adjacent pixels, $X_i$ is multiplied by $^{256}\!/_{768}$ (=⅓). The number by which $X_i$ is to be multiplied should by no means be limited to this illustrated example "$^{256}\!/_{768}$ (=⅓)".

Further, in the above description, the pixel value of the noteworthy pixel A is calculated directly from the multilevel values of pixels other than the noteworthy pixel A. This invention, however, should by no means be limited to this, and the multilevel values of pixels other than the noteworthy pixel A are respectively converted into binary values before a two-dimensional digital filter is applied to errors accompanying the conversion. The resultantly obtained value is estimated to be the error of the noteworthy pixel that are to be diffused.

The present invention should by no means be limited to the above-illustrated embodiment, and various changes or modifications may be suggested without departing from the gist of the invention.

What is claimed is:

1. A halftoning method of converting a multilevel input image into a binary image, comprising:

calculating the multilevel value of a given noteworthy pixel of the multilevel input image, as an estimated value of the noteworthy pixel, based on the multilevel values of pixels in a predetermined area that centers around a position for estimation located predetermined distance apart from the noteworthy pixel; and converting the estimated multilevel value of the noteworthy pixel into a binary value in accordance with the multilevel values each time the multilevel input image is converted into a binary image.

2. A halftoning method according to claim 1, wherein in said calculating, the estimated value of the noteworthy pixel is calculated using a two-dimensional digital filter for the multilevel pixels in the predetermined area.

3. A halftoning method according to claim 2, wherein said digital filter is a two-dimensional digital filter dedicated to profile enhancement.

4. A halftoning method according to claim 3, wherein said two-dimensional digital filter dedicated to profile enhancement is a Laplacian filter.

5. A halftoning method according to claim 3, wherein said two-dimensional digital filter dedicated to profile enhancement is a Prewitt filter.

6. A halftoning method according to claim 1, wherein a simple threshold method is used in said converting.

7. A halftoning method according to claim 1, further comprising diffusing a possible error, which has occurred in binary value with respect to the noteworthy pixel, to multilevel pixels adjacent to the noteworthy pixel by a technique.

8. A halftoning method according to claim 7, wherein a possible error, which has occurred in binary value with respect to the noteworthy pixel, is diffused to the pixels based on which the estimated value of the noteworthy pixel is calculated.

9. A halftoning method according to claim 8, further comprising: changing the technique of said error diffusing to another technique in accordance with a predetermined manner as the scanning of the pixels of the multilevel input image progresses.

10. A halftoning method according to claim 9, further comprising: discriminating whether or not the noteworthy pixel is a pixel constituting part of a profile of the multilevel input image, the error diffusion technique being changed from one to another in said changing when the result of said discriminating is positive.

11. A halftoning method according to claim 10, further comprising: detecting the direction in which the profile of the multilevel input image extends with respect to the noteworthy pixel, and wherein values according to the occurred error being added to the values of unscanned pixels along the detected direction of the profile as an exceptional process, in said error diffusing when the result of said discriminating is positive.

12. A halftoning method according to claim 10, wherein said profile discriminating is carried out by calculating a profile value of the noteworthy pixel based on both the multilevel value of the noteworthy pixel and those of the adjacent pixels and then comparing the calculated profile value with a predetermined value.

13. A halftoning method according to claim 12, wherein a two-dimensional digital filter dedicated to profile enhancement is used in said calculating of the profile value.

14. A halftoning method according to claim 13, wherein said two-dimensional digital filter dedicated to profile enhancement is a Laplacian filter.

15. A halftoning method according to claim 13, wherein said two-dimensional digital filter dedicated to profile enhancement is a Prewitt filter.

16. A halftoning method according to claim 12, wherein the profile value is directly calculated by making addition and subtraction individually on the multilevel values of the noteworthy pixel and the adjacent pixels.

17. A halftoning method according to claim 10, wherein if a plurality of multilevel input images to be halftoned have a substantially identical profile, said discriminating is carried out for only one of the plural multilevel input images, and the result of said discriminating is used in halftoning the remaining multilevel input images.

18. A halftoning method according to claim 9, wherein in said changing, the error diffusion technique is changed for every pixel of the multilevel input image.

19. A halftoning method according to claim 18, further comprising: discriminating whether or not the noteworthy pixel is a pixel constituting part of a profile of the multilevel input image, and detecting the direction in which the profile of the multilevel input image extends with respect to the noteworthy pixel, and
values according to the occurred error being added to the values of unscanned pixels along the detected direction of the profile as an exceptional process, in said error diffusing when the result of said discriminating is positive.

20. A halftoning method according to claim 9, wherein in said changing, the error diffusion technique is changed to another technique that is selected in a predetermined order from various different error diffusion techniques.

21. A halftoning method according to claim 9, wherein in said changing, the error diffusion technique is changed to another technique that is selected at random from various different error diffusion techniques.

22. A halftoning method according to claim 9, wherein
in said error diffusing, the error diffusion technique is a technique of proportionally distributing the occurred error to the plural unscanned pixels adjacent to the noteworthy pixel in accordance with a predetermined weighting pattern, and
in said changing, the error diffusion technique is changed by changing said predetermined weighting pattern to another pattern.

23. A halftoning method according to claim 7, further comprising: changing the technique of said error diffusing to another technique in accordance with a predetermined manner as the scanning of the pixels of the multilevel input image progresses.

24. A halftoning method according to claim 23, further comprising: t discriminating whether or not the noteworthy pixel is a pixel constituting part of a profile of the multilevel input image,
the error diffusion technique being changed from one to another in said changing when the result of said discriminating is positive.

25. A halftoning method according to claim 24, wherein said profile discriminating is carried out by calculating a profile value of the noteworthy pixel based on both the multilevel value of the noteworthy pixel and those of the adjacent pixels and then comparing the calculated profile value with a predetermined value.

26. A halftoning method according to claim 25, wherein a two-dimensional digital filter dedicated to profile enhancement is used in said calculating of the profile value.

27. A halftoning method according to claim 26, wherein said two-dimensional digital filter dedicated to profile enhancement is a Laplacian filter.

28. A halftoning method according to claim 26, wherein said two-dimensional digital filter dedicated to profile enhancement is a Prewitt filter.

29. A halftoning method according to claim 25, wherein the profile value is directly calculated by making addition and subtraction individually on the multilevel values of the noteworthy pixel and the adjacent pixels.

30. A halftoning method according to claim 24, wherein if a plurality of multilevel input images to be halftoned have a substantially identical profile, said discriminating is carried out for only one of the plural multilevel input images, and the result of said discriminating is used in halftoning the remaining multilevel input images.

31. A halftoning method according to claim 23, wherein in said changing, the error diffusion technique is changed for every pixel of the multilevel input image.

32. A halftoning method according to claim 23, wherein in said changing, the error diffusion technique is changed to another technique that is selected at random from various different error diffusion techniques.

33. A halftoning method according to claim 23, wherein
in said error diffusing, the error diffusion technique is a technique of proportionally distributing the occurred error to the plural unscanned pixels adjacent to the noteworthy pixel in accordance with a predetermined weighting pattern, and
in said changing, the error diffusion technique is changed by changing said predetermined weighting pattern to another pattern.

34. A halftoning method of converting a multilevel input image into a binary image, comprising:
calculating the multilevel value of a given noteworthy pixel of the multilevel input image, as an estimated value of the noteworthy pixel, based on the multilevel values of pixels other than the noteworthy pixel;
converting the estimated multilevel value of the noteworthy pixel into a binary value;
diffusing a possible error, which has occurred in binary value with respect to the noteworthy pixel, to multilevel pixels adjacent to the noteworthy pixel by a technique;
changing the technique of said error diffusing to another technique in accordance with a predetermined manner as the scanning of the pixels of the multilevel input image progresses;
discriminating whether or not the noteworthy pixel is a pixel constituting part of a profile of the multilevel input image, the error diffusion technique being changed from one to another in said changing of the technique if the result of said discriminating is positive; and
detecting the direction in which the profile of the multilevel input image extends with respect to the noteworthy pixel, values according to the occurred error being added to the values of unscanned pixels along the detected direction of the profile as an exceptional process, in said error diffusing when the result of said discriminating is positive.

35. A halftoning method of converting a multilevel input image into a binary image, comprising:
calculating the multilevel value of a given noteworthy pixel of the multilevel input image, as an estimated value of the noteworthy pixel, based on the multilevel values of pixels other than the noteworthy pixel;
converting the estimated multilevel value of the noteworthy pixel into a binary value;
diffusing a possible error, which has occurred in binary value with respect to the noteworthy pixel, to multilevel pixels adjacent to the noteworthy pixel by a technique;

changing the technique of said error diffusing to another technique in accordance with a predetermined manner as the scanning of the pixels of the multilevel input image progresses;

discriminating whether or not the noteworthy pixel is a pixel constituting part of a profile of the multilevel input image, and detecting the direction in which the profile of the multilevel input image extends with respect to the noteworthy pixel, and wherein in said changing, the error diffusion technique is changed for every pixel of the multilevel input image, and values according to the occurred error being added to the values of unscanned pixels along the detected direction of the profile as an exceptional process, in said error diffusing when the result of said discriminating is positive.

36. A halftoning method of converting a multilevel input image into a binary image, comprising:

calculating the multilevel value of a given noteworthy pixel of the multilevel input image, as an estimated value of the noteworthy pixel, based on the multilevel values of pixels other than the noteworthy pixel;

converting the estimated multilevel value of the noteworthy pixel into a binary value;

diffusing a possible error, which has occurred in binary value with respect to the noteworthy pixel, to multilevel pixels adjacent to the noteworthy pixel by a technique;

changing the technique of said error diffusing to another technique in accordance with a predetermined manner as the scanning of the pixels of the multilevel input image progresses; and wherein in said changing, the error diffusion technique is changed to another technique that is selected in a predetermined order from various different error diffusion techniques.

37. A halftoning apparatus for converting a multilevel input image into a binary image, comprising:

an estimating section for calculating the multilevel value of a given noteworthy pixel of the multilevel input image, as an estimated value of the noteworthy pixel, based on the multilevel values of pixels in a predetermined area that centers around a position for estimation located predetermined distance apart from the noteworthy pixel; and a binarizing section for converting the estimated multilevel value of the noteworthy pixel into a binary value in accordance with the multilevel values each time the multilevel input image is converted into a binary image.

38. A computer-readable recording medium in which a halftoning program for instructing a computer to execute a function of converting a multilevel input image into a binary image is recorded, wherein said halftoning program instructs the computer to function as the following:

an estimating section for calculating the multilevel value of a given noteworthy pixel of the multilevel input image, as an estimated value of the noteworthy pixel, based on the multilevel values of pixels in a predetermined area that centers around a position for estimation located predetermined distance apart from the noteworthy pixel; and a binarizing section for converting the estimated multilevel value of the noteworthy pixel into a binary value in accordance with the multilevel values each time the multilevel input image is converted into a binary image.

39. A halftoning method of converting a multilevel input image into a binary image, comprising:

calculating a multilevel value of a given noteworthy pixel of the multilevel input image, as an estimated value of the noteworthy pixel, based on the multilevel values of non-binarized pixels in a predetermined area that centers around a position for estimation located predetermined distance apart from the noteworthy pixel; and converting the estimated multilevel value of the noteworthy pixel into a binary value.

40. A halftoning method of converting a multilevel input image into a binary image, comprising:

calculating a multilevel value of a given noteworthy pixel of the multilevel input image, as an estimated value of the noteworthy pixel, based on the multilevel values of non-binarized pixels, in a predetermined area that centers around a position for estimation located predetermined distance apart from the noteworthy pixel, downstream of the noteworthy pixel in a primary scanning direction or in a secondary scanning direction; and converting the estimated multilevel value of the noteworthy pixel into a binary value.

41. A method of converting a multilevel input image into a binary image, comprising:

directly calculating a value of a noteworthy pixel of the multilevel input image from multilevel values of pixels in a predetermined area centering around a position for estimation located predetermined distance apart from the noteworthy pixel prior to halftoning, said calculated value being converted to a binary value; and selectively diffusing a possible error occurring in the binary value and subsequently changing error diffusion techniques with respect to each of the pixels surrounding the noteworthy pixel.

* * * * *

UNITED STATES PATENT AND TRADEMARK OFFICE
CERTIFICATE OF CORRECTION

PATENT NO. : 7,177,051 B2
APPLICATION NO. : 09/818498
DATED : February 13, 2007
INVENTOR(S) : Nobuaki Usui et al.

Page 1 of 1

It is certified that error appears in the above-identified patent and that said Letters Patent is hereby corrected as shown below:

Col. 23, line 46, after "comprising:" delete "t"

Signed and Sealed this

Twenty-second Day of May, 2007

JON W. DUDAS
*Director of the United States Patent and Trademark Office*